United States Patent
Soderbergh et al.

(10) Patent No.: US 11,343,595 B2
(45) Date of Patent: May 24, 2022

(54) USER INTERFACE ELEMENTS FOR CONTENT SELECTION IN MEDIA NARRATIVE PRESENTATION

(71) Applicant: PodOp, Inc., Santa Monica, CA (US)

(72) Inventors: Steven Andrew Soderbergh, New York, NY (US); Nicolas Dedual, New York, NY (US); Jose Raul Castillo, Brooklyn, NY (US); Derek H. B. Chung, Brooklyn, NY (US); Adrian Sack, London (GB); Matthew Keesan, Brooklyn, NY (US)

(73) Assignee: PODOP, INC., Santa Monica, CA (US)

( * ) Notice: Subject to any disclaimer, the term of this patent is extended or adjusted under 35 U.S.C. 154(b) by 443 days.

(21) Appl. No.: 16/290,412

(22) Filed: Mar. 1, 2019

(65) Prior Publication Data

US 2019/0273972 A1 Sep. 5, 2019

Related U.S. Application Data

(60) Provisional application No. 62/637,056, filed on Mar. 1, 2018.

(51) Int. Cl.
*H04N 21/431* (2011.01)
*H04N 21/4722* (2011.01)
(Continued)

(52) U.S. Cl.
CPC ... *H04N 21/8541* (2013.01); *H04N 21/23424* (2013.01); *H04N 21/4316* (2013.01); *H04N 21/4722* (2013.01); *H04N 21/8545* (2013.01)

(58) Field of Classification Search
None
See application file for complete search history.

(56) References Cited

U.S. PATENT DOCUMENTS 10,284,753 B1   5/2019 Naik et al.
2001/0049988 A1  12/2001 Ushiwata et al.
(Continued)

FOREIGN PATENT DOCUMENTS

KR     20170017700        2/2017
WO     2004092881 A2     10/2004
WO     WO-2016115154 A1 * 7/2016  ............. G06Q 50/10

OTHER PUBLICATIONS

International Search Report and Written Opinion for PCT/US2019/054296 dated Jan. 17, 2020, 12 pages.
(Continued)

*Primary Examiner* — Junior O Mendoza
(74) *Attorney, Agent, or Firm* — Cozen O'Connor

(57) ABSTRACT

An interactive narrative presentation includes a plurality of narrative segments, with a variety of available media content consumer selectable paths or directions, typically specified by a director or editor. The content consumer can select a path or path segment at each of a number of points, e.g., decision points, in the narrative presentation via user interface elements or narrative prompts, providing the consumer the opportunity to follow a storyline they find interesting. Each consumer follows a "personalized" path through the narrative. The narrative prompts can include images from subsequent segments, may be generated to stylistically resemble the underlying narrative presentation, may be animated to move with or with respect to the underlying narrative presentation, and, or may be presented in overlaid with a presentation of the underlying narrative while the underlying narrative continues play.

21 Claims, 18 Drawing Sheets

(51) Int. Cl.
*H04N 21/8545* (2011.01)
*H04N 21/8541* (2011.01)
*H04N 21/234* (2011.01)

(56) References Cited

U.S. PATENT DOCUMENTS

| | | |
|---|---|---|
| 2004/0091848 A1 | 5/2004 | Nemitz |
| 2007/0099684 A1 | 5/2007 | Butterworth |
| 2011/0126106 A1 | 5/2011 | Ben et al. |
| 2012/0102418 A1 | 4/2012 | Joy et al. |
| 2013/0165225 A1 | 6/2013 | Fuller et al. |
| 2013/0229433 A1 | 9/2013 | Reitan |
| 2014/0002580 A1* | 1/2014 | Bear .................. A63F 13/213 348/14.07 |
| 2014/0087877 A1 | 3/2014 | Krishnan |
| 2015/0222861 A1 | 8/2015 | Fujii et al. |
| 2016/0034160 A1 | 2/2016 | Kaltner et al. |
| 2016/0191893 A1 | 6/2016 | Gewickey et al. |
| 2016/0299645 A1* | 10/2016 | Shan ...................... H04L 51/32 |
| 2017/0105052 A1 | 4/2017 | Defaria et al. |
| 2017/0150212 A1 | 5/2017 | Wang |
| 2018/0279007 A1* | 9/2018 | Peterson ............ H04N 21/8541 |
| 2019/0025586 A1 | 1/2019 | Sawaki |
| 2019/0132521 A1 | 5/2019 | Fujita et al. |
| 2019/0289203 A1 | 9/2019 | Suitoh et al. |

OTHER PUBLICATIONS

Argyriou, Lemonia, et al., 'Engaging immersive video consumers: Challenges regarding 360-degree gamified video applications', 15th Intl. Conf. on Ubiquitous Computing and Communications and 18th Intl. Symposium on Cyberspace and Security, pp. 145-152. (Year: 2016).

Chambel, Teresa, et al., 'Towards Immersive Interactive Video Through 360° Hypervideo', p. 78, ACE'2011. (Year 2011).

International Search Report and Written Opinion for PCT/US2019/020422, dated Jun. 19, 2019, 10 pages.

* cited by examiner

USER INTERFACE ELEMENTS FOR CONTENT SELECTION IN MEDIA NARRATIVE PRESENTATION

TECHNICAL FIELD

This application is generally related to interactive media narrative presentation in which media content consumers select paths through a narrative presentation that comprises a plurality of narrative segments in audio, visual, and audio-visual forms.

BACKGROUND

The art of storytelling is a form of communication dating back to ancient times. Storytelling allows humans to pass information on to one another for entertainment and instructional purposes. Oral storytelling has a particularly long history and involves the describing of a series of events using words and other sounds. More recently, storytellers have taken advantage of pictures and other visual presentations to relate the events comprising the story. Particularly effective is a combination of audio and visual representations, most commonly found in motion pictures, television programs, and video presentations.

Until recently, narrative presentations have typically been non-interactive, the series of events forming the story being presented as a sequence of scenes in a predefined set or chosen by a director or editor. Although "Director's Cuts" and similar presentations may provide a media content consumer with additional media content (e.g., additional scenes, altered order of scenes) or information related to one or more production aspects of the narrative, such information is often presented as an alternative to the standard narrative presentation (e.g., theatrical release) or simultaneous (e.g., as a secondary audio program) with the standard narrative presentation. At times, such "Director's Cuts" provide the media content consumer with additional scenes (e.g., scenes removed or "cut" during the editing process to create a theatrical release). However, such presentation formats still rely on the presentation of scenes in an order completely defined by the director or editor before release.

At other times, supplemental content in the form of voiceovers or similar features involving actors or others involved in the production of the narrative is available to the media content consumer (e.g., BD-LIVE® for BLU-RAY® discs). However, such content is often provided as an alternative to or contemporaneous with the narrative. Thus, such features rely on the presentation of scenes in an order predefined by the director or editor.

Some forms of media provide the media content consumer with an ability to affect the plotline. For example, video games may implement a branching structure, where various branches will be followed based on input received from the media content consumer. Also for example, instructional computer programs may present a series of events where media content consumer input selections change the order of presentation of the events, and can cause the computer to present some events, while not presenting other events.

SUMMARY

A variety of new user interface structures and techniques are set out herein, particularly suited for use in interactive narrative presentation. These techniques and structures address various technical problems in defining and/or delivering narratives in a way that allows media content to be customized for the media content consumers while the media content consumers explore the narratives in a way that is at least partially under the control of the media content consumer. These techniques and structures may also address various technical problems in other presentation environments or scenarios. In some instances, a media content player and/or backend system may implement the delivery of the narrative presentation employing some of the described techniques and structures. The described techniques and structures may also be used to provide an intuitive user interface that allows a content consumer to interact with an interactive media presentation, in a seamless form, for example where the user interface elements are rendered to appear as if they were part of the original filming or production.

A narrative may be considered a defined sequence of narrative events that conveys a story or message to a media content consumer. Narratives are fundamental to storytelling, games, and educational materials. A narrative may be broken into a number of distinct segments, which may, for example, comprise one or more of a number of distinct scenes. A narrative may even be presented episodically, with episodes being released periodically, aperiodically, or even in bulk (e.g., entire season of episodes all released on the same day).

Characters within the narrative will interact with other characters, other elements in the story, and the environment itself as the narrative presentation progresses. Even with the most accomplished storytelling, only a limited number of side storylines and only a limited quantity of character development can occur within the timeframe prescribed for the overall narrative presentation. Often editors and directors will selectively omit a significant portion of the total number of narrative threads or events available for inclusion in the narrative presentation. The omitted narrative threads or events may be associated with the perspective, motivation, mental state, or similar character aspects of one or more characters appearing in the narrative presentation. While omitted narrative threads or events do not necessarily change the overall storyline (i.e., outcome) of the narrative, they can provide the media content consumer with insights on the perspective, motivation, mental state, or similar other physical or mental aspects of one or more characters appearing in the narrative presentation, and hence modify the media content consumer's understanding or perception of the narrative and/or characters. Such omitted narrative threads or events may be in the form of distinct narrative segments, for instance vignettes or additional side storylines related to (e.g., sub-plots of) the main storyline of the larger narrative.

Providing a media content consumer with user selectable icons, the user selectable icons each corresponding to a respective narrative segment or portion of a path, at defined points (e.g., decision points) along a narrative provides an alternative to the traditional serial presentation of narrative segments selected solely by the production and/or editing team. Advantageously, the ability for media content consumers to view a narrative based on personally selected narrative segments or paths enables each media content consumer to uniquely experience the narrative.

Linear narratives, for instance films, movies, or other productions, are typically uniquely stylized. The style may be associated with a particular director, cinematographer, or even a team of people who work on the specific production. For example, some directors may carry a similar style through multiple productions, while other directors may change their style from production to production. At least part of the stylistic effect is related to or defined by the cameras used to film various scenes, and even the lighting used during filming. Stylistic effects associated with cameras can be represented at least to some extent by the characteristics of the cameras. Each camera or more precisely each camera and lens combination can be characterized by a set of intrinsic characteristics or parameters and a set of extrinsic characteristics or parameters.

The style is an important artistic aspect of most productions, and any changes to the style may detract from the enjoyment and artistic merit of the production. In is typically desirable to avoid modifying or otherwise detracting from the style of a given production.

Whether the production (e.g., narrative) is to be presented in an interactive format, user interface elements must be introduced to allow control over viewing. Some user interface elements can control play, pause, fast forward, fast rewind, scrubbing. Interactive narratives may additionally provide user interface elements that allow the viewer or content consumer to select a path through a narrative. Applicant has recognized that it is important to prevent the user interface from modifying or otherwise detracting from the style of a production.

Notably, a user interface or user interface element can detract from the style of a production if not adapted to be consistent with the style of the production. Given the large divergence in styles, such adaptation of the user interface typically would need to be one a one to one basis. Such an approach would be difficult, time consuming, and costly.

BRIEF DESCRIPTION OF THE DRAWINGS

In the drawings, identical reference numbers identify similar elements or acts. The sizes and relative states of elements in the drawings are not necessarily drawn to scale. For example, the positions of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
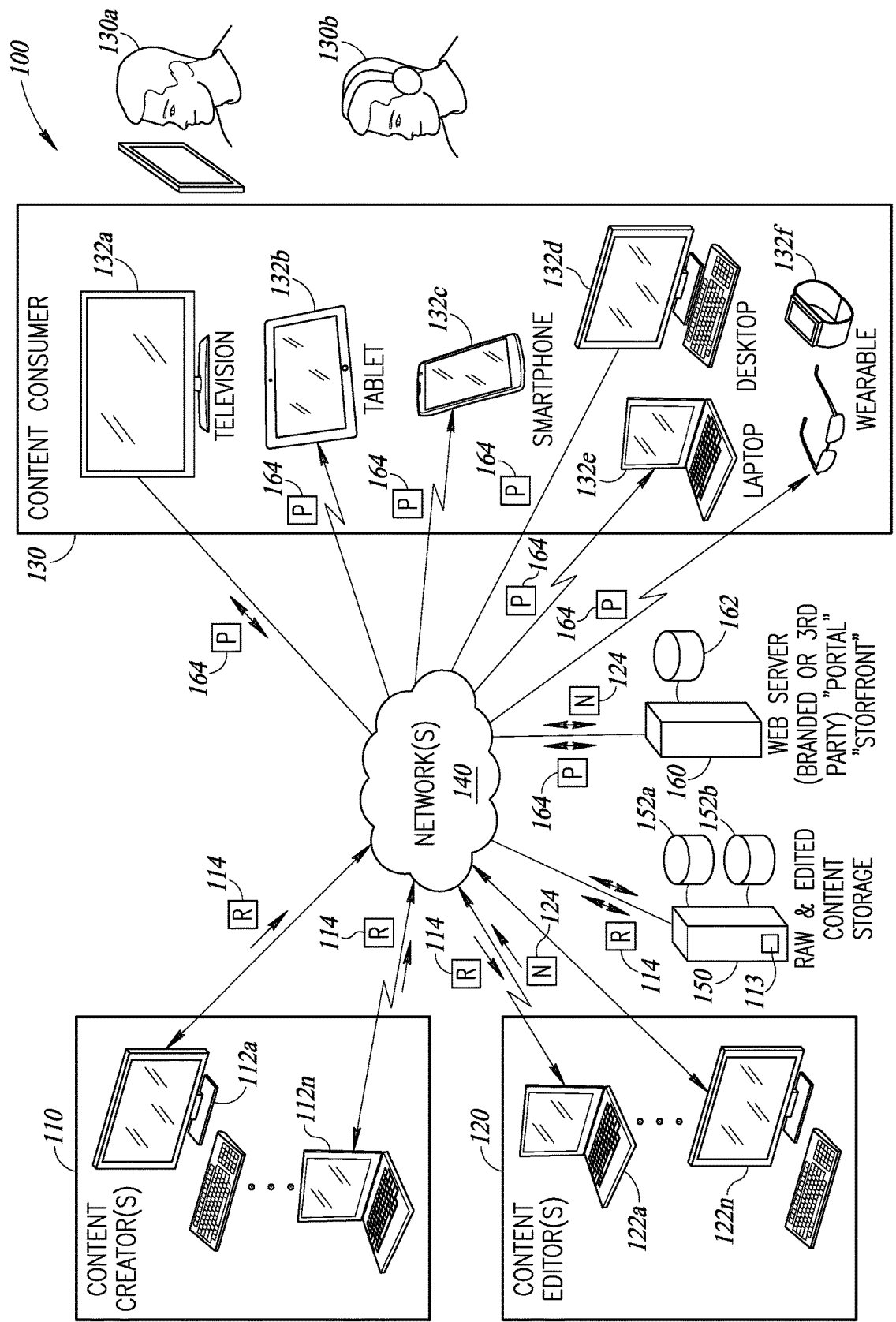
FIG. 1 is a schematic diagram of an illustrative content delivery system network that includes media content creators, media content editors, and media content consumers, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with processors, user interfaces, nontransitory storage media, media production, or media editing techniques have not been shown or described in detail to avoid unnecessarily obscuring descriptions of the embodiments. Additionally, tethered and wireless networking topologies, technologies, and communications protocols are not shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

As used herein the term "production" should be understood to refer to media content that includes any form of human perceptible communication including, without limitation, audio media presentations, visual media presentations, and audio/visual media presentations, for example a movie, film, video, animated short, television program.

As used herein the terms "narrative" and "narrative presentation" should be understood to refer to a human perceptible presentation including audio presentations, video presentations, and audio-visual presentations. A narrative typically presents a story or other information in a format including at least two narrative segments having a distinct temporal order within a time sequence of events of the respective narrative. For example, a narrative may include at least one defined beginning or foundational narrative segment. A narrative also includes one additional narrative segment that falls temporally after the beginning or foundational narrative segment. In some implementations, the one additional narrative segment may include at least one defined ending narrative segment. A narrative may be of any duration.

As used herein the term "narrative segment" should be understood to refer to a human perceptible presentation including an audio presentation, a video presentation, and an audio-visual presentation. A narrative includes a plurality of narrative events that have a sequential order within a timeframe of the narrative, extending from a beginning to an end of the narrative. The narrative may be composed of a plurality of narrative segments, for example a number of distinct scenes. At times, some or all of the narrative segments forming a narrative may be user selectable. At times some of the narrative segments forming a narrative may be fixed or selected by the narrative production or editing team. At times some of the narrative segments forming a narrative may be selected by a processor-enabled device based upon information and/or data related to the media content consumer. At times an availability of some of the narrative segments to a media content consumer may be conditional, for example subject to one or more conditions set by the narrative production or editing team. A narrative segment may have any duration, and each of the narrative segments forming a narrative may have the same or different durations. In most instances, a media content consumer will view a given narrative segment of a narrative in its entirety before another narrative segment of the narrative is subsequently presented to the media content consumer.

As used herein the terms "production team" and "production or editing teams" should be understood to refer to a team including one or more persons responsible for any aspect of producing, generating, sourcing, or originating media content that includes any form of human perceptible communication including, without limitation, audio media presentations, visual media presentations, and audio/visual media presentations.

As used herein the terms "editing team" and "production or editing teams" should be understood to refer to a team including one or more persons responsible for any aspect of editing, altering, joining, or compiling media content that includes any form of human perceptible communication including, without limitation, audio media presentations, visual media presentations, and audio/visual media presentations. In at least some instances, one or more persons may be included in both the production team and the editing team.

As used herein the term "media content consumer" should be understood to refer to one or more persons or individuals who consume or experience media content in whole or in part through the use of one or more of the human senses (i.e., seeing, hearing, touching, tasting, smelling).

As used herein the term "aspects of inner awareness" should be understood to refer to inner psychological and physiological processes and reflections on and awareness of inner mental and somatic life. Such awareness can include, but is not limited to the mental impressions of an individual's internal cognitive activities, emotional processes, or bodily sensations. Manifestations of various aspects of inner awareness may include, but are not limited to self-awareness or introspection. Generally, the aspects of inner awareness are intangible and often not directly externally visible but are instead inferred based upon a character's words, actions, and outwardly expressed emotions. Other terms related to aspects of inner awareness may include, but are not limited to, metacognition (the psychological process of thinking about thinking), emotional awareness (the psychological process of reflecting on emotion), and intuition (the psychological process of perceiving somatic sensations or other internal bodily signals that shape thinking). Understanding a character's aspects of inner awareness may provide enlightenment to a media content consumer on the underlying reasons why a character acted in a certain manner within a narrative presentation. Providing media content including aspects of a character's inner awareness enables production or editing teams to include additional material that expands the narrative presentation for media content consumers seeking a better understanding of the characters within the narrative presentation.

The headings and Abstract of the Disclosure provided herein are for convenience only and do not interpret the scope or meaning of the embodiments. FIG. 1 shows an example network environment 100 in which content creators 110, content editors 120, and media content consumers 130 (e.g., viewers 130a, listeners 130b) are able to create and edit raw content 113 to produce narrative segments 124 that can be assembled into narrative presentations 164, according to an illustrative embodiment. A content creator 110, for example a production team, generates raw (i.e., unedited) content 113 that is edited and assembled into at least one production, for example a narrative presentation 164 by an editing team. This raw content may be generated in analog format (e.g., film images, motion picture film images), digital format (e.g., digital audio recording, digital video recording, digitally rendered audio and/or video recordings, computer generated imagery ["CGI"]). Where at least a portion of the content is in analog format, one or more converter systems or processors convert the analog content to digital format. The production team, using one or more content creator processor-based devices 112a-112n (collectively, "content creator processor-based devices 112"), communicates the content to one or more raw content storage systems 150 via the network 140.

An editing team, serving as content editors 120, accesses the raw content 113 and edits the raw content 113 via a number of processor-based editing systems 122a-122n (collectively "content editing systems processor-based devices 122") into a number of narrative segments 124. These narrative segments 124 are assembled at the direction of the editing or production teams to form a collection of narrative segments and additional or bonus content that, when combined, comprise a production, for example a narrative presentation 164. The narrative presentation 164 can be delivered to one or more media content consumer processor-based devices 132a-132n (collectively, "media content consumer processor-based devices 132") either as one or more digital files via the network 140 or via a nontransitory storage media such as a compact disc (CD); digital versatile disk (DVD); or any other current or future developed nontransitory digital data carrier. In some implementations, the one or more of the narrative segments 124 may be streamed via the network 140 to the media content consumer processor-based devices 132.

In some implementations, the media content consumers 130 may access the narrative presentations 164 via one or more media content consumer processor-based devices 132. These media content consumer processor-based devices 132 can include, but are not limited to: televisions or similar image display units 132a, tablet computing devices 132b, smartphones and handheld computing devices 132c, desktop computing devices 132d, laptop and portable computing devices 132e, and wearable computing devices 132f. At times, a single media content consumer 130 may access a narrative presentation 164 across multiple devices and/or platforms. For example, a media content consumer may non-contemporaneously access a narrative presentation 164 using a plurality of media content consumer processor-based devices 132. For example, a media content consumer 130 may consume a narrative presentation 164 to a first point using a television 132a in their living room and then may access the narrative presentation at the first point using their tablet computer 132b or smartphone 132c as they ride in a carpool to work.

At times, the narrative presentation 164 may be stored in one or more nontransitory storage locations 162, for example coupled to a Web server 160 that provides a network accessible portal via network 140. In such an instance, the Web server 160 may stream the narrative presentation 164 to the media content consumer processor-based device 132. For example, the narrative presentation 164 may be presented to the media content consumer 130 on the media content consumer processor-based device 132 used by the media content consumer 130 to access the portal on the Web server 160 upon the receipt, authentication, and authorization of log-in credentials identifying the respective media content consumer 130. Alternatively, the entire narrative presentation 164, or portions thereof (e.g., narrative segments), may be retrieved on an as needed or as requested basis as discrete units (e.g., individual files), rather than streamed. Alternatively, the entire narrative presentation 164, or portions thereof, may be cached or stored on the media content consumer processor-based device 132, for instance before selection of specific narrative segments by the media content consumer 130. On some implementations, one or more content delivery networks (CDNs) may cache narratives at a variety of geographically distributed locations to increase a speed and/or quality of service in delivering the narrative content.

Note that the narrative segment features and relationships discussed may be illustrated in different figures for clarity and ease of discussion. However, some or all of the narrative segment features and relationships are combinable in any way or in any manner to provide additional embodiments. Such additional embodiments generated by combining narrative segment features and relationships fall within the scope of this disclosure.

Figure 2:
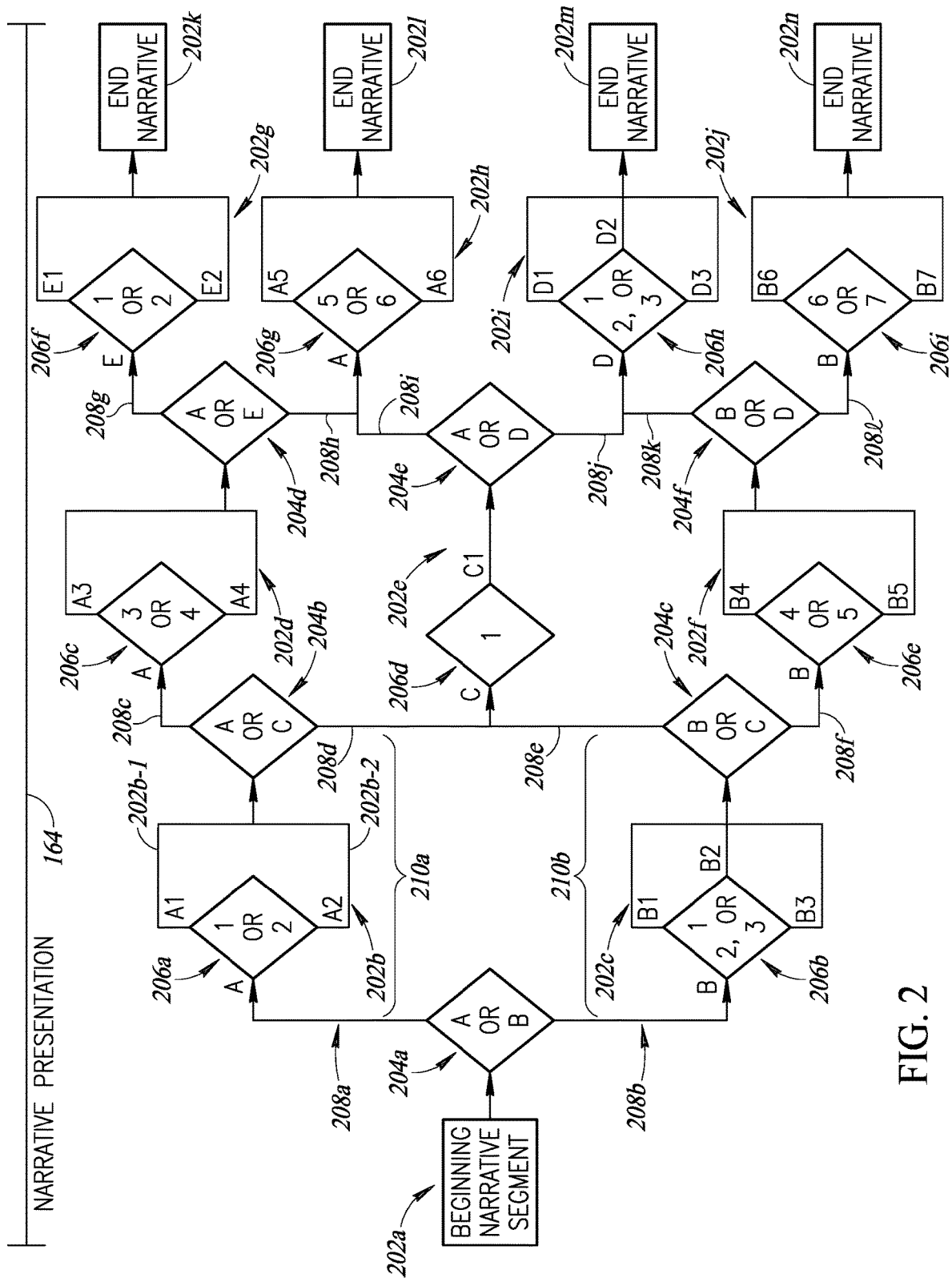
FIG. 2 is a flow diagram of a narrative presentation with a number of narrative prompts, points (e.g., segment decision points), and narrative segments, according to at least one illustrated implementation.

FIG. 2 shows a flow diagram of a production in the form of a narrative presentation 164 comprised of a number of narrative segments 202a-202n (collectively, "narrative segments 202"), a set of path direction prompts 204a-204f (collectively, "narrative prompts 204"), and a set of points 206a-206i (collectively, "points 206", e.g., path direction decision points).

The narrative presentation 164 may be an interactive narrative presentation 164, in which the media content consumer 130 selects or chooses, or at least influences, a path through the narrative presentation 164. In some implementations, input from the media content consumer 130 may be received, the input representing an indication of the selection or decision by the media content consumer 130 regarding the path direction to take for each or some of the points 206. The user selection or input may be in response to a presentation of one or more user interface elements that allow selection between two or more user selectable path direction options for a give point (e.g., path direction decision point).

Optionally, in some implementations, one or more of the content creator processor-based devices 112a-112n, the media content consumer processor-based devices 132a-132n, or other processor-based devices may autonomously generate a selection indicative of the path direction to take for each or some of the points 206 (e.g., path direction decision point). In such an implementation, the choice of path direction for each media content consumer 130 may be made seamlessly without interruption and, or with presentation of a path direction prompt 204 or other selection prompt. Optionally, in some implementations, the autonomously generated path direction selection may be based at least on information that represents one or more characteristics of the media content consumer 130, instead of being based on an input by the media content consumer 130 in response to a presentation of two or more user selectable path direction options.

The media content consumer 130 may be presented with the narrative presentation 164 as a series of narrative segments 202. Narrative segment 202a represents the beginning or foundational narrative segment and narrative segments 202k-202n represent terminal narrative segments that are presented to the media content consumer 130 to end the narrative presentation 164. Note that the events depicted in the terminal narrative segments 202k-202n may occur before, during, or after the events depicted within the foundational narrative segment 202a. By presenting the same beginning or foundational narrative segment 202a, each media content consumer 130 may for example, be introduced to an overarching common story and plotline. Optionally, the narrative presentation 164 may have a single terminal or ending narrative segment 202 (e.g., finale, season finale, narrative finale). In some implementations, each narrative segment 202 may be made available to every media content consumer 130 accessing the narrative presentation 164 and presented to every media content consumer 130 who elects to view such. In some implementations, at least some of the narrative segments 202 may be restricted such as to be presented to only a subset of media content consumers 130. For example, some of the narrative segments 202 may be accessible only by media content consumers 130 who purchase a premium presentation option, by media content consumers 130 who earned access to limited distribution content, for instance via social media sharing actions, or by media content consumers 130 who live in certain geographic locations.

User interface elements, denominated herein as path direction prompts 204, may be incorporated into various points along the narrative presentation 164 at which one path direction among multiple path directions may be chosen in order to proceed through the narrative presentation 164. Path directions are also referred to interchangeably herein as path segments, and represent directions or sub-paths within an overall narrative path. For the most part, path directions selected by the content consumer are logically associated (i.e., relationship defined in a data structure stored in processor-readable memory or storage) with a respective set of narrative segments.

In operation, the system causes presentation of user interface elements or path direction prompts 204. The system receives user input or selections made via the user interface elements or path direction prompts 204. Each user input or selection identifies a media content consumer selected path to take at a corresponding point in the narrative presentation 164.

In one mode of operation, the media content consumer selected path corresponds to or otherwise identifies a specific narrative segment. In this mode of operation, the system causes presentation of the corresponding specific narrative segment in response to selection by the media content consumer of the media content consumer selected path. Optionally in this mode of operation, the system may make a selection of a path direction if the media content consumer does not select a path or provide input within a specified period of time.

In another mode of operation, the media content consumer selected path corresponds to or otherwise identifies a set of two or more narrative segments, which narrative segments in the set are alternative "takes" to one another. For example, each of the narrative segments may have the same story arc, only may only differ in some way that is insubstantial to the story, for instance including a different make and model of vehicle in each of the narrative segments of the set of narrative segments. Additionally or alternatively each narrative segment in the set of narrative segments may include a different drink or beverage. In this mode of operation, for each set of narrative segments, the system can autonomously select a particular narrative segment from the set of two or more narrative segments, based on collected information. The system causes presentation of the corresponding particular narrative segment in response to the autonomous selection from the set, where the set is based on the media content consumer selected path identified by the selection by the media content consumer via the user interface element(s). Optionally in this mode of operation, the system may make a selection of a path direction if the media content consumer does not select a path or provide input within a specified period of time.

For example, at a first point (e.g., first decision point), indicated by the first path direction prompt 204a, a selection or decision may be made between path direction A 208a or path direction B 208b. Path direction A 208a may, for example, be associated with a one set of narrative segments 202b, and path direction B 208b may, for example, be associated with another set of narrative segments 202c. The narrative path portion associated with path direction A 208a may have a path length 210a that extends for the duration of the narrative segment presented from the set of narrative segments 202b. The narrative path portion associated with path direction B 208b may have a path length of 210b that extends for the duration of the narrative segment presented from the set of narrative segments 202c. The path length 210a may or may not be equal to the path length 210b. In some implementations, at least some of the narrative segments 202 subsequent to the beginning or foundational narrative segment 202a represent segments selectable by the media content consumer 130 at the appropriate narrative prompt 204. It is the particular sequence of narrative segments 202 selected by the media content consumer 130 that determines the details and sub-plots (within the context of the overall story and plotline of the narrative presentation 164) experienced or perceived by the particular media content consumer 130. The various path directions 208 may be based upon, for example, various characters appearing in the preceding narrative segment 202, different settings or locations, different time frames, or different actions that a character may take at the conclusion of the preceding narrative segment 202.

As previously noted, each media content consumer selected path can correspond to a specific narrative segment, or may correspond to a set of two or more narrative segments, which are alternative (e.g., alternative "takes") to one another. As previously noted, for each set of narrative segments that correspond to a selected narrative path direction, the system can select a particular narrative segment from the corresponding set of narrative segments, for instance based at least in part on collected information that represents attributes of the media content consumer.

In some implementations, the multiple path directions available at a path direction prompt 204 may be based on the characters present in the immediately preceding narrative segment 202. For example, the beginning or foundational narrative segment 202a may include two characters "CHAR A" and "CHAR B." At the conclusion of narrative segment 202a, the media content consumer 130 is presented with the first path direction prompt 204a including icons representative of a subset of available path directions 208 that the media content consumer 130 may choose to proceed through the narrative presentation 164. The subset of path directions 208 associated with the first path direction prompt 204a may, for example, include path direction A 208a that is logically associated (e.g., mapped in memory or storage media) to a set of narrative segments 202b associated with CHAR A and the path direction B 208b that is logically associated (e.g., mapped in memory or storage media) to a set of narrative segments 202c associated with CHAR B. The media content consumer 130 may select an icon to continue the narrative presentation 164 via one of the available (i.e., valid) path directions 208. If the media content consumer 130 selects the icon representative of the narrative path direction that is logically associated in memory with the set of narrative segments 202b associated with CHAR A at the first path direction prompt 204a, then one of the narrative segments 202 from the set of narrative segment 202b containing characters CHAR A and CHAR C is presented to the media content consumer 130. At the conclusion of narrative segment 202b, the media content consumer is presented with a second path direction prompt 204b requiring the selection of an icon representative of either CHAR A or CHAR C to continue the narrative presentation 164 by following CHAR A in path direction 208c or CHAR C in path direction 208d. Valid paths as well as the sets of narrative segments associated with each valid path may, for example, be defined by the writer, director, and, or the editor of the narrative, limiting the freedom of the media content consumer in return for placing some structure on the overall narrative.

If instead, the media content consumer 130 selects the icon representative of the narrative path direction that is logically associated in memory with the set of narrative segments 202c associated with CHAR B at the first path direction prompt 204a, then one of the narrative segments 202 from the set of narrative segment 202c containing characters CHAR B and CHAR C is presented to the media content consumer 130. At the conclusion of narrative segment 202c, the media content consumer 130 is presented with a third path direction prompt 204c requiring the selection of an icon representative of either CHAR B or CHAR C to continue the narrative presentation 164 by following CHAR B in path direction 208f or CHAR C in path direction 208e. In such an implementation, CHAR C interacts with both CHAR A during the set of narrative segment 202b and with CHAR B during the set of narrative segment 202c, which may occur, for example, when CHAR A, CHAR B, and CHAR C are at a party or other large social gathering. In such an implementation, the narrative segment 202e associated with CHAR C may have multiple entry points, one from the second narrative prompt 204b and one from the third narrative prompt 204c. In some implementations, such as that shown in connection with the fourth point 206d (e.g. segment decision point), at least some points 206 (e.g., path direction decision points) may have only one associated narrative segment 202. In such implementations, the point 206 (e.g., path direction decision points) will present the single associated narrative segment 202 to the media content consumer 130.

Depending on the path directions 208 selected by the media content consumer 130, not every media content consumer 130 is necessarily presented the same number of narrative segments 202, the same narrative segments 202, or the same duration for the narrative presentation 164. A distinction may arise between the number of narrative segments 202 presented to the media content consumer 130 and the duration of the narrative segments 202 presented to the media content consumer 130. The overall duration of the narrative presentation 164 may vary depending upon the path directions 208 selected by the media content consumer 130, as well as the number and/or length of each of the narrative segments 202 presented to the media content consumer 130.

The path direction prompts 204 may allow the media content consumer 130 to choose a path direction they wish to follow, for example specifying a particular character and/or scene or sub-plot to explore or follow. In some implementations, a decision regarding the path direction to follow may be made autonomously by one or more processor-enabled devices, e.g., the content editing systems processor-based devices 122 and/or the media content consumer processor-based devices 132, without a user input that represents the path direction selection or without a user input that that is responsive to a query regarding path direction.

In some instances, the path directions are logically associated with a respective narrative segment 202 or a sequence of narrative segments (i.e., two or more narrative segments that will be presented consecutively, e.g., in response to a single media content consumer selection).

In other instances the path directions are logically associated with a respective set of two or more alternative narrative segments 202 (i.e., a single segment of the set of two or more will be selected to be presented, e.g., in response to a single media content consumer selection and an autonomous selection from the corresponding set by the system). Each set of narrative segments may include two or more narrative segments 202 that preferably include the same characters, follow same story arc or portion thereof, and may even share identical dialog and character interactions, and narrative techniques. At least one of the narrative segments 202 from the set of narrative segments may be selected or chosen, either by the media content consumer 130 and/or autonomously by a processor-enabled device, at a point 206. The narrative segments in a given set of narrative segments may differ from one in another in subtle ways. For example, each of the narrative segments in a given set of narrative segments may have different types of objects or different brands of objects appearing in the respective segment, for example in the background or even being handled by a character. For instance, a first narrative segment may include a first type of drink or a first brand of drink, or a first type of vehicle or first brand of vehicle, while a second narrative segment may include a second type of drink or a second brand of drink, or a second type of vehicle or second brand of vehicle, different than the first. Likewise, other narrative segments in a given set of narrative segments may include other types of drinks, brands of drinks, types of vehicles, and, or brands of vehicles.

The differences between narrative segments in a given set of narrative segments are not limited to drinks and vehicles, but instead can represent any type of object or product or even service. In some implementations, the commercial products in the two or more of the narrative segments in any set of the narrative segments may be the same as one another but reflect different features of the commercial product. For example, in a set of narrative segments involving a car, one of the narrative segments may emphasize the speed or performance of the car such as might appeal to media content consumer 130 comprised of younger audience member, whereas another of the narrative segments may emphasize the safety features of the car, as might appeal to media content consumer 130 comprised of a parent. In such an implementation, selecting the next narrative segment to present based on the appearance of one of the commercial products in the next narrative segment may be based at least in part on the retrieved collected information about the media content consumer 130. This approach advantageously allows the narrative to be tailored to the particular media content consumer, while still allowing the media content consumer some choice in control over the narrative presentation, and allowing the writer, director, and, or the editor some control over the overall structure of the narrative. The narrative segments 202 included within each set of narrative segments associated with a given path direction and given point 206 (e.g., decision point) may be previously defined, for example, by the content creator (e.g., writer, director) 110 and/or the content editor 120. For a chosen path direction A 208a, for example, at the point 206a (e.g., path direction decision point), the system may choose a narrative segment from a previously defined set of narrative segments 202b logically associated with the particular path direction and the particular point (e.g., path direction decision point), based on an assessment of attributes that characterize the particular media content consumer. That set of narrative segments may, for example, include first narrative segment A1 202b-1 and second narrative segment A2 202b-2.

Each of the first narrative segment A1 202b-1 and the second narrative segment A2 202b-2 may belong to a set of narrative segments logically associated (i.e., relationship stored in memory or storage) with the chosen path direction A 208a. The two narratives segment A1 202b-1 and A2 202b-2 may present the same plotline, story arc, and characters to the media content consumer 130, but may be used to customize the details with the narrative segment 202b for the particular media content consumer 130 being presented with the narrative presentation 164. In such an implementation, for example, the props, settings, clothing, or other features may be modified between the narrative segment A1 202b-1 and the narrative segment A2 202b-2, and customized based upon the media content consumer 130. Thus, for example, in the narrative segment A1 202b-1, CHAR A may drink a sports drink such as Gatorade®, whereas in the narrative segment A2 202b-2, CHAR A may drink a bottled water such as Dasani®. As such, the ability to customize the features of a narrative segment 202 may advantageously be used to target product placements of commercial products and/or other types of advertisements towards the media content consumers 130 being presented with the narrative presentation 164. As shown in FIG. 2, a point 206 (e.g., segment decision point) may represent a location in the narrative presentation 164 in which a narrative segment 202 from a previously defined set of a plurality of narrative segments 202 to be chosen or selected to be presented to the media content consumer 130 (e.g., the second segment point 206b (e.g., decision point), which has a previously defined set of three narrative segments 202c).

In some implementations, the narrative prompts 204, for example presented at points (e.g., path direction decision points), may be user-actionable such that the media content consumer 130 may choose the path direction, and hence the particular narrative segment, or the set of narrative segments 202 from which a particular narrative segment 202 will be selected to be presented. In at least some implementations, the system may autonomously select a path direction and/or a particular narrative segment 202 from a set of previously defined narrative segments 202 associated with a selected path direction without receiving any selection by the media content consumer 130. In such an implementation, the system may select the particular narrative segment from the set of narrative segments (i.e., set of alternative narrative segments), the set of narrative segments associated with the selected path direction or path direction decision point, based upon information related to the media content consumer 130. Such information may include, for example, demographic information about the media content consumer 130, previous browsing history by the media content consumer 130, previous viewing history of the media content consumer 130 related to the current and/or past narrative presentations 164 presented to the media content consumer 130, and any other collected information related to the media content consumer 130. As such, the selection of the narrative segment 202 to present to the media content consumer 130 at a point 206 (e.g., segment decision point) may occur automatically from the perspective of the media content consumer 130 such that the selected narrative segment 202 may be incorporated seamlessly into the narrative presentation 164.

In at least some implementations, while each media content consumer 130 may receive the same overall storyline in the narrative presentation 164, because media content consumers 130 may select different respective path directions or narrative segment "paths" though the narrative presentation 164, different media content consumers 130 may have different impressions, feelings, emotions, and experiences, at the conclusion of the narrative presentation 164.

As depicted in FIG. 2, not every narrative segment 202 need include or conclude with a user interface element or narrative prompt 204 containing a plurality of icons, each of which corresponds to a respective media content consumer-selectable narrative segment 202. For example, if the media content consumer 130 selects CHAR A at the fourth narrative prompt 204d, the media content consumer 130 is presented a narrative segment from the set of narrative segments 202h followed by the terminal narrative segment 202l.

At times, at the conclusion of the narrative presentation 164 there may be at least some previously non-selected and/or non-presented path directions or narrative segments 202 which the media content consumers 130 may not be permitted access, either permanently or without meeting some defined condition(s). Promoting an exchange of ideas, feelings, emotions, perceptions, and experiences of media content consumers 130 via social media may beneficially increase interest in the respective narrative presentation 164, increasing the attendant attention or word-of-mouth promotion of the respective narrative presentation 164 among media content consumers 130. Such attention advantageously fosters the discussion and exchange of ideas between media content consumers 130 since different media content consumers take different path directions 208 through the narrative presentation 164, and may otherwise be denied access to one or more narrative segments 202 of a narrative presentation 164 which was not denied to other media content consumers 130. This may create the perception among media content consumers 130 that interaction and communication with other media content consumers 130 is beneficial in better or more fully understanding the respective narrative presentation 164. At least some of the approaches described herein provide media content consumers 130 with the ability to selectively view path directions or narrative segments 202 in an order either completely self-chosen, or self-chosen within a framework of order or choices and/or conditions defined by the production or editing teams. Allowing the production or editing teams to define a framework of order or choices and/or conditions maintains the artistic integrity of the narrative presentation 164 while promoting discussion related to the narrative presentation 164 (and the different path directions 208 through the narrative presentation 164) among media content consumers 130. Social media and social networks such as FACEBOOK®, TWITTER®, SINA WEIBO, FOURSQUARE®, TUMBLR®, SNAPCHAT®, and/or VINE® facilitate such discussion among media content consumers 130.

In some implementations, media content consumers 130 may be rewarded or provided access to previously inaccessible non-selected and/or non-presented path directions or narrative segments 202 contingent upon the performance of one or more defined activities. In some instances, such activities may include generating or producing one or more social media actions, for instance social media entries related to the narrative presentation (e.g., posting a comment about the narrative presentation 164 to a social media "wall", "liking", or linking to the narrative, narrative segment 202, narrative character, author or director). Such selective unlocking of non-selected narrative segments 202 may advantageously create additional attention around the respective narrative presentation 164 as media content consumers 130 further exchange communications in order to access some or all of the non-selected path directions or narrative segments 202. At times, access to non-selected path directions or narrative segments 202 may granted contingent upon meeting one or more defined conditions associated with social media or social networks. For example, access to a non-selected path directions or narrative segment 202 may be conditioned upon receiving a number of favorable votes (e.g., FACEBOOK® LIKES) for a comment associated with the narrative presentation 164. Other times, access to non-selected path directions or narrative segments 202 may be granted contingent upon a previous viewing by the media content consumer 130, for instance having viewed a defined number of path directions or narrative segments 202, having viewed one or more particular path directions or narrative segments 202, having followed a particular path direction 208 through the narrative presentation 164. Additionally or alternative, access to non-selected and/or non-presented path directions or narrative segments 202 may be granted contingent upon sharing a path direction or narrative segment 202 with another media content consumer 130 or receiving a path direction or narrative segment 202 or access thereto as shared by another media content consumer with the respective media content consumer.

Figure 3:
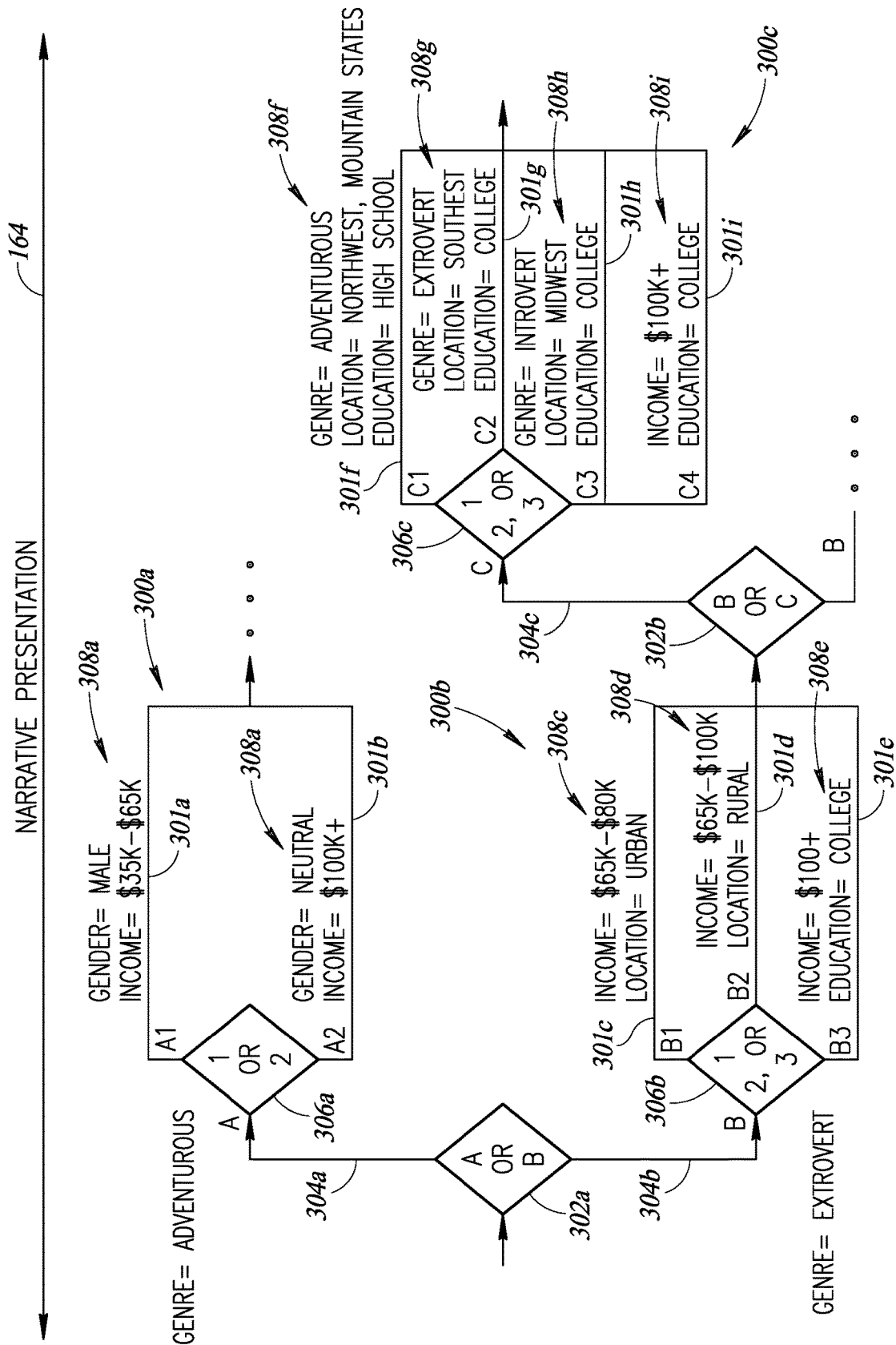
FIG. 3 is a flow diagram of a portion of a narrative presentation showing selection parameters associated with various narrative segments, according to at least one illustrated implementation.

FIG. 3 shows a portion of a narrative presentation 164 per at least one mode of operation. The portion of a narrative presentation 164 includes a set A of two or more narrative segments 300a that are alternatives to one another, a set B of two or more narrative segments 300b that are alternatives to one another, and a set C of two or more narrative segments 300c that are alternatives to one another, each set of which includes a plurality of narrative segments (collectively, "segments 301") which are alternatives to one another (i.e., in response to selection of a path direction corresponding to the set, one narrative segment of the set will be presented in lieu of the other narrative segments of the set). When the media content consumer 130 encounters the first narrative prompt 302a at a first path direction point (e.g. path direction decision point), the media content consumer 130 may choose to follow narrative path A 304a to the set A of narrative segments 300a or narrative path B 304b to the B set of narrative segments B 300b. In some implementations, information regarding the selection by the media content consumer 130 at the first narrative prompt 302a may be associated with the media content consumer 130. For example, as shown in FIG. 3, narrative path A 304a may be associated with a certain type of character (e.g., adventurous, hero) whereas narrative path B 304b is associated with different type of character (e.g., introverted, intellectual, anti-hero).

In some implementations, such associations may be determined by matching or correlating values for parameters across a collection of media content consumers 130 who have made the same selection. As such, the collected information regarding the selections of one media content consumer 130 may be mapped or correlated against the likes and dislikes (likes and dislikes explicitly or inherently expressed) of other media content consumers who have made similar selections to determine the potential likes and dislikes of the one media content consumer 130. Such a mapping or correlation of possible likes and dislikes may be used to automatically and autonomously determine narrative segments to present to the media content consumer 130 based upon manual selections that the media content consumer 130 has made (e.g., selections regarding the type of narrative presentation 164 to be presented, selections regarding the narrative path to take from a set of multiple possible narrative paths, and other manual selections).

The system may not only autonomously select a given narrative segment from a set of narrative segments based directly on a set of attributes that represent a particular content consumer. For example, the system may additionally, or alternatively autonomously select a given narrative segment from a set of narrative segments based indirectly on the attributes of a particular media content consumer as represented by the attributes of other media content users to which the particular media content consumer is correlated. Thus, the system draws inferences about likes and dislikes of a particular media content consumer based on "proxy" media content consumers who have similar viewing patterns and/or similar path direction selections. The system may employ various artificial intelligence or machine learning techniques to infer or discern such patterns, for example using collected information as a training population. While in some implementations exact matches may be employed, in other implementations inexact or close matches or correlations may be employed. Thus, for example, the system may identify a statistical significant correlation between the attributes, viewing and, or path direction selections of a first media content consumers and those of a group of other media content consumers. The system may then use the correlation to select a given narrative segment, for instance including a first product or service placement, from a set of narrative segments for a particular selected path direct at a particular path direction point (e.g., path direction decision point).

The narrative presentation 300 may then proceed along the chosen narrative path 304 to a point 306 (e.g., path direction decision point), such as a first point 306a (e.g., path direction decision point) along narrative path A 304a, or a second point 306b (e.g., path direction decision point) along narrative path B 304b. The first point 306a (e.g., path direction decision point) along narrative path A 304a may provide a choice between a set A 300a of two or more narrative segments, for instance a narrative segment A1 301a and a narrative segment A2 301b. Each of the narrative segments 301a and 301b may be associated with a respective set of various selection parameters 308 that may be used to select between the various narrative segments 301a and 301b to present to a media content consumer 130. Each of the selection parameters 308 may have values associated with the selection parameter 308. For example, narrative segment A1 301a, for example, may have a first set of selection parameters 308a that includes the gender (with a value of Male) and income (with a value of the range $35 k-65 k) associated with the media content consumer 130. Narrative segment A2 301b may have a second set of selection parameters 308b that includes gender (with a value of Neutral) and income (with a value of the range $100 k+). In some implementations, the values for each of the selection parameters 308 associated with each narrative segment 301a and 301b in the set A 300a of narrative segments may or may not overlap. The types of selection parameters 308 associated with each narrative segment within a set of narrative segments may or may not overlap. As shown in narrative path B 304b, for example, the set of selection parameters associated with the narrative segments B1 301c and B2 301*d* may differ from the set of selection parameter associated with the narrative segment B3 301*e*.

When the narrative presentation 164 encounters a point 306 (e.g., path direction decision point), the set of selection parameters 308 associated with the narrative segments within the set of narrative segments may be compared to information related to and collected from the media content consumer 130 to determine the narrative segment 301 to present to the media content consumer 130. The collected information related to the media content consumer 130 may include, for example, demographic information such as gender, age or age range, income or income range, geographic location, education level, marital status, religion, ethnicity, occupation, and other such information. Location information may include, for example, the geographic location (e.g., New England or Pacific Northwest) or the type of location (e.g., rural, suburban, urban). Such demographic information regarding each media content consumer 130 may be collected at various times, such as, for example, when each media content consumer 130 signs up to access or logs into the network environment 100. Other collected information may be used to identify the narrative segment 301 to present to a media content consumer 130. Such collected information may include, for example, the browsing history for or prior Webpages viewed by the media content consumer 130, and/or the prior selections by the media content consumer 130 for other narrative presentations 164 in general, or prior selections for narrative segments 301 at prior narrative prompts 302, either during the current narrative presentation 164 or during prior narrative presentations 164. Such collected information may further or alternatively include commercial products that have been shown to the media content consumer 130 during a previously presented narrative segment 301.

The collected information related to each media content consumer 130 may be stored on one or more memory storage devices, such as, for example, the non-transitory storage locations 162 communicatively coupled to the network 140. In some implementations, the selection or decision regarding the narrative segment 301 to present to the media content consumer 130 may be autonomously made by a processor-enabled device that is located remote from the media content consumer processor-based device 132. In some implementations, the information related to a media content consumer 130 may be loaded onto the local media content consumer processor-based device 132 being used to present the narrative presentation 164 such that selections or decisions regarding the narrative segment 301 to present to a media content consumer 130 may be autonomously made locally on the media content consumer processor-based device 132.

In some implementations, at least some of the selection parameters 308 may be related to previous decisions or choices made by the media content consumer 130. As shown at a third point 306*c* (e.g., path direction decision point) associated with narrative path C 304*c*, for example, the set of selection parameters 308 includes a selection parameter related to different genres of presentations, and such a selection parameter may be matched, for example, based upon decisions or choices made by the media content consumer 130 at previous narrative prompts 302. The set of selection parameters 308*f* associated with narrative segment C1 301*f* includes a genre parameter with a value of "Adventurous"; the set of selection parameters 308*g* associated with the narrative segment C2 301*g* includes a genre parameter with a value of "Extrovert"; and the set of selection parameters 308*h* associated with the narrative segment C3 301*h* includes a genre parameter with a value of "Introvert." The information associated with the media content consumer 130 to be matched against the genre selection parameter may be collected as a result of choices that the media content consumer 130 made during the current and/or previous narrative presentations 164. Such a choice occurred, for example, at the first path direction prompt 302*a* in which a choice to proceed via narrative path A 304*a* is associated with the genre "Adventurous" and the choice to proceed via narrative path B 304*b* is associated with the genre "Extrovert." As shown, the values associated with the selection parameters 308*i* for narrative segment C4 301*i* included within a first set of narrative segments associated with third point 306*c* (e.g., path direction decision point) may be the same as the selection parameters 308*e* for narrative segment B3 301*e* that is included within a second set of narrative segments associated with the second point 306*b* (e.g., path direction decision point).

In some implementations, the selection of the narrative segment 301 from the set of narrative segments to present to a media content consumer 130 may be based upon determining a match or correlation between the values for the selection parameters associated with each of the narrative segments 301 included within the set of narrative segments 301 and the information related to the media content consumer 130. In some implementations, the selection of the narrative segment 301 to present to a media content consumer 130 may be based upon determining a closest match between the values for the selection parameters associated with each of the narrative segments 301 included within the set of narrative segments 301 and the information related to the media content consumer 130. In some implementations, for example, each selection parameter within the set of selection parameter 308 may be associated with a weighted score, such that a match or correlation between a selection parameter and the information related to the media content consumer 130 may result in the associated weighted score being added to a total score for the narrative segment 301. The narrative segment 301 with the highest score may be selected to be presented to the media content consumer 130. In such an implementation, the weight scores may be positive or negative. Additional or alternative criteria may be used to select the narrative segment 301 to be presented to the media content consumer 130. A correlation may be a correlation within a defined threshold, or alternatively could be a "best" correlation, being the most correlated relationship that is found, even if below some defined threshold or even if there is no defined minimum threshold. In some instances, the system may rely on a best correlation where a match is not found.

Figure 4:
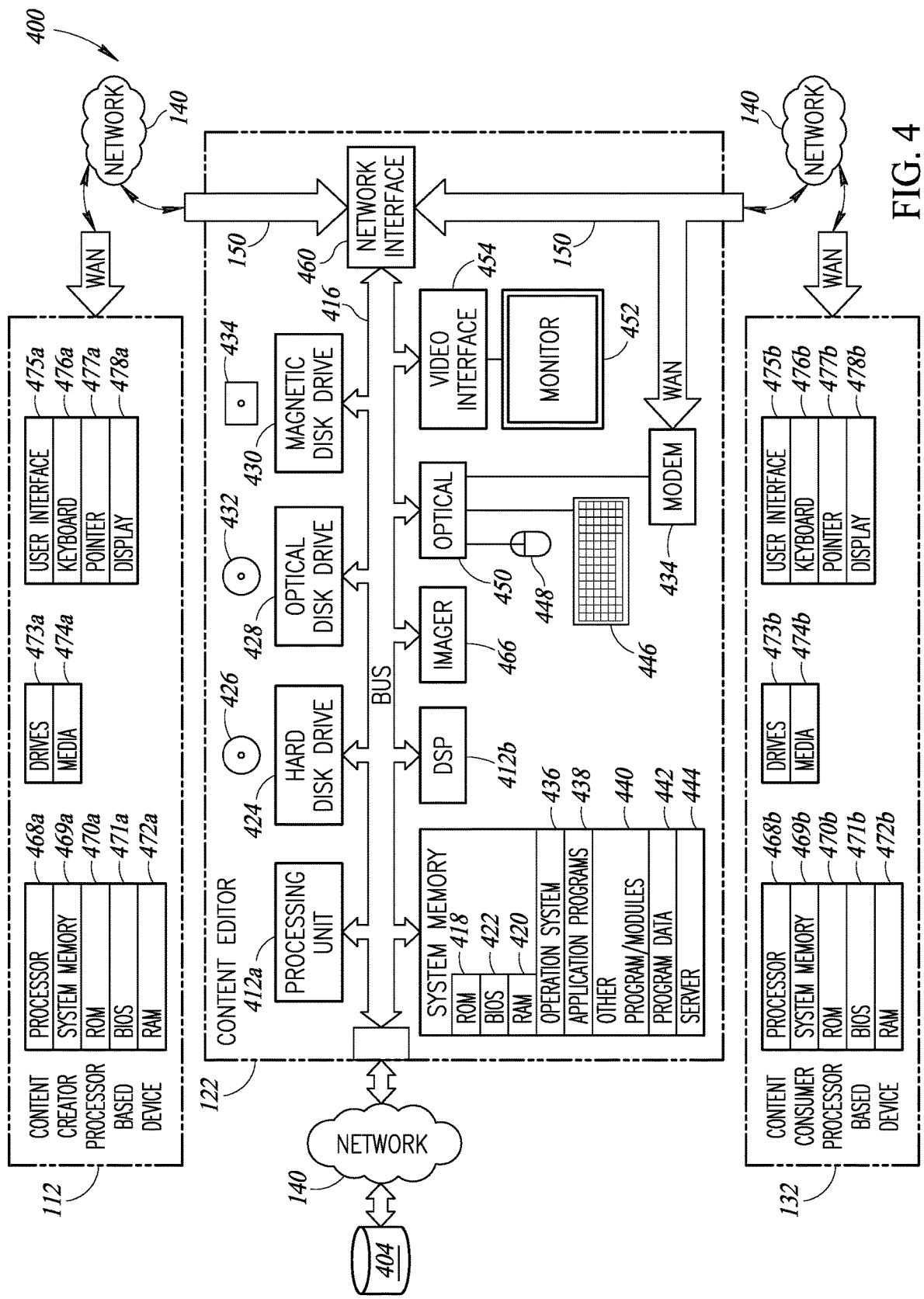
FIG. 4 is a simplified block diagram of an illustrative content editor system, according to at least one illustrated implementation.

FIG. 4 and the following discussion provide a brief, general description of a suitable networked content editing system environment 400 in which the various illustrated embodiments may be implemented. Although not required, the embodiments will be described in the general context of computer-executable instructions, such as program application modules, objects, or macros stored on computer- or processor-readable media and executed by a computer or processor. Those skilled in the relevant arts will appreciate that the illustrated embodiments, as well as other embodiments, can be practiced with other processor-based system configurations and/or other processor-based computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 4 shows a networked content editing system environment 400 in which one or more content creators 110 provide raw content 113 in the form of unedited narrative segments to one or more content editing system processor-based devices 122. The content editing system processor-based device 122 refines the raw content 113 provided by the one or more content creators 110 into a number of finished narrative segments 202 and logically assembles the finished narrative segments 202 into a narrative presentation 164. A production team, an editing team, or a combined production and editing team are responsible for refining and assembling the finished narrative segments 202 into a narrative presentation 164 in a manner that maintains the artistic integrity of the narrative segment sequences included in the narrative presentation 164. The narrative presentation 164 is provided to media content consumer processor-based devices 132 either as a digital stream via network 140, a digital download via network 140, or stored on one or more non-volatile storage devices such as a compact disc, digital versatile disk, thumb drive, or similar.

At times, the narrative presentation 164 may be delivered to the media content consumer processor-based device 132 directly from one or more content editing system processor-based devices 122. At other times, the one or more content editing system processor-based devices 122 transfers the narrative presentation 164 to a Web portal that provides media content consumers 130 with access to the narrative presentation 164 and may also include one or more payment systems, one or more accounting systems, one or more security systems, and one or more encryption systems. Such Web portals may be operated by the producer or distributor of the narrative presentation 164 and/or by third parties such as AMAZON® or NETFLIX®.

The content editing system processor-based device 122 includes one or more processor-based editing devices 122 (only one illustrated) and one or more communicably coupled nontransitory computer- or processor readable storage medium 404 (only one illustrated) for storing and editing raw narrative segments 114 received from the content creators 110 into finished narrative segments 202 that are assembled into the narrative presentation 164. The associated nontransitory computer- or processor readable storage medium 404 is communicatively coupled to the one or more processor-based editing devices 120 via one or more communications channels. The one or more communications channels may include one or more tethers such as parallel cables, serial cables, universal serial bus ("USB") cables, THUNDERBOLT® cables, or one or more wireless channels capable of digital data transfer, for instance near field communications ("NFC"), FIREWIRE®, or BLUETOOTH®.

The networked content editing system environment 400 also comprises one or more content creator processor-based device(s) 112 (only one illustrated) and one or more media content consumer processor-based device(s) 132 (only one illustrated). The one or more content creator processor-based device(s) 112 and the one or more media content consumer processor-based device(s) 132 are communicatively coupled to the content editing system processor-based device 122 by one or more communications channels, for example one or more wide area networks (WANs) 140. In some implementations, the one or more WANs may include one or more worldwide networks, for example the Internet, and communications between devices may be performed using standard communication protocols, such as one or more Internet protocols. In operation, the one or more content creator processor-based device(s) 112 and the one or more media content consumer processor-based device(s) 132 function as either a server for other computer systems or processor-based devices associated with a respective entity or themselves function as computer systems. In operation, the content editing system processor-based device 122 may function as a server with respect to the one or more content creator processor-based device(s) 112 and/or the one or more media content consumer processor-based device(s) 132.

The networked content editing system environment 400 may employ other computer systems and network equipment, for example additional servers, proxy servers, firewalls, routers and/or bridges. The content editing system processor-based device 122 will at times be referred to in the singular herein, but this is not intended to limit the embodiments to a single device since in typical embodiments there may be more than one content editing system processor-based device 122 involved. Unless described otherwise, the construction and operation of the various blocks shown in FIG. 4 are of conventional design. As a result, such blocks need not be described in further detail herein, as they will be understood by those skilled in the relevant art.

The content editing system processor-based device 122 may include one or more processing units 412 capable of executing processor-readable instruction sets to provide a dedicated content editing system, a system memory 414 and a system bus 416 that couples various system components including the system memory 414 to the processing units 412. The processing units 412 include any logic processing unit capable of executing processor- or machine-readable instruction sets or logic. The processing units 412 maybe in the form of one or more central processing units (CPUs), digital signal processors (DSPs), application-specific integrated circuits (ASICs), reduced instruction set computers (RISCs), field programmable gate arrays (FPGAs), logic circuits, systems on a chip (SoCs), etc. The system bus 416 can employ any known bus structures or architectures, including a memory bus with memory controller, a peripheral bus, and/or a local bus. The system memory 414 includes read-only memory ("ROM") 418 and random access memory ("RAM") 420. A basic input/output system ("BIOS") 422, which can form part of the ROM 418, contains basic routines that help transfer information between elements within the content editing system processor-based device 122, such as during start-up.

The content editing system processor-based device 122 may include one or more nontransitory data storage devices. Such nontransitory data storage devices may include one or more hard disk drives 424 for reading from and writing to a hard disk 426, one or more optical disk drives 428 for reading from and writing to removable optical disks 432, and/or one or more magnetic disk drives 430 for reading from and writing to magnetic disks 434. Such nontransitory data storage devices may additionally or alternatively include one or more electrostatic (e.g., solid-state drive or SSD), electroresistive (e.g., memristor), or molecular (e.g., atomic spin) storage devices.

The optical disk drive 428 may include a compact disc drive and/or a digital versatile disk (DVD) configured to read data from a compact disc 432 or DVD 432. The magnetic disk 434 can be a magnetic floppy disk or diskette. The hard disk drive 424, optical disk drive 428 and magnetic disk drive 430 may communicate with the processing units 412 via the system bus 416. The hard disk drive 424, optical disk drive 428 and magnetic disk drive 430 may include interfaces or controllers (not shown) coupled between such drives and the system bus 416, as is known by those skilled in the relevant art. The drives 424, 428 and 430, and their associated computer-readable media 426, 432, 434, provide nonvolatile storage of computer-readable instructions, data structures, program modules and other data for the content editing system processor-based device 122. Although the depicted content editing system processor-based device 122 is illustrated employing a hard disk drive 424, optical disk drive 428, and magnetic disk drive 430, other types of computer-readable media that can store data accessible by a computer may be employed, such as WORM drives, RAID drives, flash memory cards, RAMs, ROMs, smart cards, etc.

Program modules used in editing and assembling the raw narrative segments 114 provided by content creators 110 are stored in the system memory 414. These program modules include modules such as an operating system 436, one or more application programs 438, other programs or modules 440 and program data 442.

Application programs 438 may include logic, processor-executable, or machine executable instruction sets that cause the processor(s) 412 to automatically receive raw narrative segments 114 and communicate finished narrative presentations 164 to a Webserver functioning as a portal or storefront where media content consumers 130 are able to digitally access and acquire the narrative presentations 164. Any current (e.g., CSS, HTML, XML) or future developed communications protocol may be used to communicate either or both the raw narrative segments 114, finished narrative segments 202, and narrative presentations 164 to and from local and/or remote nontransitory storage 152 as well as to communicate narrative presentations 164 to the Webserver.

Application programs 438 may include any current or future logic, processor-executable instruction sets, or machine-executable instruction sets that facilitate the editing, alteration, or adjustment of one or more human-sensible aspects (sound, appearance, feel, taste, smell, etc.) of the raw narrative segments 114 into finished narrative segments 202 by the editing team or the production and editing teams.

Application programs 438 may include any current or future logic, processor-executable instruction sets, or machine-executable instruction sets that facilitate the assembly of finished narrative segments 202 into a narrative presentation 164. Such may include, for example, a narrative assembly editor (e.g., a "Movie Creator") that permits the assembly of finished narrative segments 202 into a narrative presentation 164 at the direction of the editing team or the production and editing teams. Such may include instructions that facilitate the creation of narrative prompts 204 that appear either during the pendency of or at the conclusion of narrative segments 202. Such may include instructions that facilitate the selection of presentation formats (e.g., split screen, tiles, or lists, among others) for the narrative prompts 204 that appear either during the pendency of or at the conclusion of narrative segments 202. Such may include instructions that facilitate the creation of logical or Boolean expressions or conditions that autonomously and/or dynamically create or select icons for inclusion in the narrative prompts 204 that appear either during the pendency of or at the conclusion of narrative segments 202. At times, such logical or Boolean expressions or conditions may be based in whole or in part on inputs representative of actions or selections taken by media content consumers 130 prior to or during the presentation of the narrative presentation 164.

Such application programs may include any current or future logic, processor-executable instruction sets, or machine-executable instruction sets that provide for choosing a narrative segment 202 from a set of narrative segments 202 associated with a point 206 (e.g., segment decision point). In some implementations, a set of one or more selection parameters 308 may be associated with each of the narrative segments 202 in the set of narrative segments 202. The selection parameters 308 may be related to information regarding potential media content consumers 130, such as demographic information, Webpage viewing history, previous narrative presentation 164 viewing history, previous selections at narrative prompts 204, and other such information. The set of selection parameters 308 and associated values may be stored in and accessed from local and/or remote nontransitory storage 152. Each of the selection parameters 308 may have associated values that the application program may compare with collected information associated with a media content consumer 130 to determine the narrative segment 202 to be presented to the media content consumer 130. The application program may determine the narrative segment 202 to present based upon, for example, by selecting the narrative segment 202 with the associated set of values that matches a desired set of values based upon the collected information regarding the media content consumer 130; by selecting the narrative segment 202 with the associated set of values that most closely matches a desired set of values based upon the collected information regarding the media content consumer 130; by selecting the narrative segment with the associated set of values that differ from a desired set of values by more or less than the associated set of values of another of the narrative segments. One or more types of data structures (e.g., a directed acyclic graph, as discussed in FIG. 7) may be used to store the possible (i.e., valid) narrative paths along with the respective sets of possible narrative segments associated with each narrative path.

Such application programs may include any current or future logic, processor-executable instruction sets, or machine-executable instruction sets that facilitate providing media content consumers 130 with access to non-selected narrative segments 202. Such may include logic or Boolean expressions or conditions that include data representative of the interaction of the respective media content consumer 130 with one or more third parties, one or more narrative-related Websites, and/or one or more third party Websites. Such instructions may, for example, collect data indicative of posts made by a media content consumer 130 on one or more social networking Websites as a way to encouraging online discourse between media content consumers 130 regarding the narrative presentation 164.

Such application programs may include any current or future logic, processor-executable instruction sets, or machine-executable instruction sets that facilitate the collection and generation of analytics or analytical measures related to the sequences of narrative segments 202 selected by media content consumers 130. Such may be useful for identifying a "most popular" narrative segment sequence, a "least viewed" narrative segment sequence, a "most popular" narrative segment 202, a "least popular" narrative segment, a time spent viewing a narrative segment 202 or the narrative presentation 164, etc.

Other program modules 440 may include instructions for handling security such as password or other access protection and communications encryption. The system memory

414 may also include communications programs, for example a server that causes the content editing system processor-based device 122 to serve electronic or digital documents or files via corporate intranets, extranets, or other networks as described below. Such servers may be markup language based, such as Hypertext Markup Language (HTML), Extensible Markup Language (XML) or Wireless Markup Language (WML), and operate with markup languages that use syntactically delimited characters added to the data of a document to represent the structure of the document. A number of suitable severs may be commercially available such as those from MOZILLA®, GOOGLE®, MICROSOFT®, and APPLE COMPUTER®.

While shown in FIG. 4 as being stored in the system memory 414, the operating system 436, application programs 438, other programs/modules 440, program data 442 and browser 444 may be stored locally, for example on the hard disk 426, optical disk 432 and/or magnetic disk 434. At times, other programs/modules 440, program data 442 and browser 444 may be stored remotely, for example on one or more remote file servers communicably coupled to the content editing system processor-based device 122 via one or more networks such as the Internet.

A production team or editing team member enters commands and data into the content editing system processor-based device 122 using one or more input devices such as a touch screen or keyboard 446 and/or a pointing device such as a mouse 448, and/or via a graphical user interface ("GUI"). Other input devices can include a microphone, joystick, game pad, tablet, scanner, etc. These and other input devices are connected to one or more of the processing units 412 through an interface 450 such as a serial port interface that couples to the system bus 416, although other interfaces such as a parallel port, a game port or a wireless interface or a Universal Serial Bus ("USB") can be used. A monitor 452 or other display device couples to the system bus 416 via a video interface 454, such as a video adapter. The content editing system processor-based device 122 can include other output devices, such as speakers, printers, etc.

The content editing system processor-based device 122 can operate in a networked environment using logical connections to one or more remote computers and/or devices. For example, the content editing system processor-based device 122 can operate in a networked environment using logical connections to one or more content creator processor-based device(s) 112 and, at times, one or more media content consumer processor-based device(s) 132. Communications may be via tethered and/or wireless network architecture, for instance combinations of tethered and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the content editing system processor-based device 122 and the one or more content creator processor-based device(s) 112 and the one or more media content consumer processor-based device(s) 132.

The one or more content creator processor-based device(s) 112 and the one or more media content consumer processor-based device(s) 132 will typically take the form of processor-based devices, for instance personal computers (e.g., desktop or laptop computers), netbook computers, tablet computers and/or smartphones and the like, executing appropriate instructions. At times, the one or more content creator processor-based device(s) 112 may include still or motion picture cameras or other devices capable of acquiring data representative of human-sensible data (data indicative of sound, sight, smell, taste, or feel) that are capable of directly communicating data to the content editing system processor-based device 122 via network 140. At times, some or all of the one or more content creator processor-based device(s) 112 and the one or more media content consumer processor-based device(s) 132 may communicably couple to one or more server computers. For instance, the one or more content creator processor-based device(s) 112 may communicably couple via one or more remote Webservers that include a data security firewall. The server computers may execute a set of server instructions to function as a server for a number of content creator processor-based device(s) 112 (i.e., clients) communicatively coupled via a LAN at a facility or site. The one or more content creator processor-based device(s) 112 and the one or more media content consumer processor-based device(s) 132 may execute a set of client instructions and consequently function as a client of the server computer(s), which are communicatively coupled via a WAN.

The one or more content creator processor-based device(s) 112 and the one or more media content consumer processor-based device(s) 132 may each include one or more processing units 468*a*, 468*b* (collectively "processing units 468"), system memories 469*a*, 469*b* (collectively, "system memories 469") and a system bus (not shown) that couples various system components including the system memories 469 to the respective processing units 468. The one or more content creator processor-based device(s) 112 and the one or more media content consumer processor-based device(s) 132 will at times each be referred to in the singular herein, but this is not intended to limit the embodiments to a single content creator processor-based device 112 and/or a single media content consumer processor-based device 132. In typical embodiments, there may be more than one content creator processor-based device 112 and there will likely be a large number of media content consumer processor-based devices 132. Additionally, one or more intervening data storage devices, portals, and/or storefronts not shown in FIG. 4 may be present between the content editing system processor-based device 122 and at least some of the media content consumer processor-based devices 132.

The processing units 468 may be any logic processing unit, such as one or more central processing units (CPUs), digital signal processors (DSPs), application-specific integrated circuits (ASICs), logic circuits, reduced instruction set computers (RISCs), field programmable gate arrays (FPGAs), etc. Non-limiting examples of commercially available computer systems include, but are not limited to, an i3, i5, and i7 series microprocessors available from Intel Corporation, U.S.A., a Sparc microprocessor from Sun Microsystems, Inc., a PA-RISC series microprocessor from Hewlett-Packard Company, an A4, A6, or A8 series microprocessor available from Apple Computer, or a Snapdragon processor available from Qualcomm Corporation. Unless described otherwise, the construction and operation of the various blocks of the one or more content creator processor-based device(s) 112 and the one or more media content consumer processor-based device(s) 132 are of conventional design. As a result, such blocks need not be described in further detail herein, as they will be understood by those skilled in the relevant arts.

The system bus can employ any known bus structures or architectures, including a memory bus with memory controller, a peripheral bus, and a local bus. The system memory 469 includes read-only memory ("ROM") 470a, 470b (collectively 470) and random access memory ("RAM") 472a, 472b (collectively 472). A basic input/output system ("BIOS") 471a, 471b (collectively 471), which can form part of the ROM 470, contains basic routines that help transfer information between elements within the one or more content creator processor-based device(s) 112 and the one or more media content consumer processor-based device(s) 132, such as during start-up.

The one or more content creator processor-based device(s) 112 and the one or more media content consumer processor-based device(s) 132 may also include one or more media drives 473a, 473b (collectively 473), e.g., a hard disk drive, magnetic disk drive, WORM drive, and/or optical disk drive, for reading from and writing to computer-readable storage media 474a, 474b (collectively 474), e.g., hard disk, optical disks, and/or magnetic disks. The computer-readable storage media 474 may, for example, take the form of removable non-transitory storage media. For example, hard disks may take the form of a Winchester drives, and optical disks can take the form of CD-ROMs, while electrostatic nontransitory storage media may take the form of removable USB thumb drives. The media drive(s) 473 communicate with the processing units 468 via one or more system buses. The media drives 473 may include interfaces or controllers (not shown) coupled between such drives and the system bus, as is known by those skilled in the relevant art. The media drives 473, and their associated computer-readable storage media 474, provide nonvolatile storage of computer readable instructions, data structures, program modules and other data for the one or more content creator processor-based devices 112 and/or the one or more media content consumer processor-based devices 132. Although described as employing computer-readable storage media 474 such as hard disks, optical disks and magnetic disks, those skilled in the relevant art will appreciate that one or more content creator processor-based device(s) 112 and/or one or more media content consumer processor-based device(s) 132 may employ other types of computer-readable storage media that can store data accessible by a computer, such as flash memory cards, digital video disks ("DVD"), RAMs, ROMs, smart cards, etc. Data or information, for example, electronic or digital documents or files or data (e.g., metadata, ownership, authorizations) related to such can be stored in the computer-readable storage media 474.

Program modules, such as an operating system, one or more application programs, other programs or modules and program data, can be stored in the system memory 469. Program modules may include instructions for accessing a Website, extranet site or other site or services (e.g., Web services) and associated Web pages, other pages, screens or services hosted by components communicatively coupled to the network 140.

Program modules stored in the system memory of the one or more content creator processor-based devices 112 include any current or future logic, processor-executable instruction sets, or machine-executable instruction sets that facilitate the collection and/or communication of data representative of raw narrative segments 114 to the content editing system processor-based device 122. Such application programs may include instructions that facilitate the compression and/or encryption of data representative of raw narrative segments 114 prior to communicating the data representative of the raw narrative segments 114 to the content editing system processor-based device 122.

Program modules stored in the system memory of the one or more content creator processor-based devices 112 include any current or future logic, processor-executable instruction sets, or machine-executable instruction sets that facilitate the editing of data representative of raw narrative segments 114. For example, such application programs may include instructions that facilitate the partitioning of a longer narrative segment 202 into a number of shorter duration narrative segments 202.

Program modules stored in the one or more media content consumer processor-based device(s) 132 include any current or future logic, processor-executable instruction sets, or machine-executable instruction sets that facilitate the presentation of the narrative presentation 164 to the media content consumer 130.

The system memory 469 may also include other communications programs, for example a Web client or browser that permits the one or more content creator processor-based device(s) 112 and the one or more media content consumer processor-based device(s) 132 to access and exchange data with sources such as Web sites of the Internet, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 469, the operating system, application programs, other programs/modules, program data and/or browser can be stored on the computer-readable storage media 474 of the media drive(s) 473. A content creator 110 and/or media content consumer 130 enters commands and information into the one or more content creator processor-based device(s) 112 and the one or more media content consumer processor-based device(s) 132, respectively, via a user interface 475a, 475b (collectively "user interface 475") through input devices such as a touch screen or keyboard 476a, 476b (collectively "input devices 476") and/or a pointing device 477a, 477b (collectively "pointing devices 477") such as a mouse. Other input devices can include a microphone, joystick, game pad, tablet, scanner, etc. These and other input devices are connected to the processing unit 469 through an interface such as a serial port interface that couples to the system bus, although other interfaces such as a parallel port, a game port or a wireless interface or a universal serial bus ("USB") can be used. A display or monitor 478a, 478b (collectively 478) may be coupled to the system bus via a video interface, such as a video adapter. The one or more content creator processor-based device(s) 112 and the one or more media content consumer processor-based device(s) 132 can include other output devices, such as speakers, printers, etc.

Figure 5:
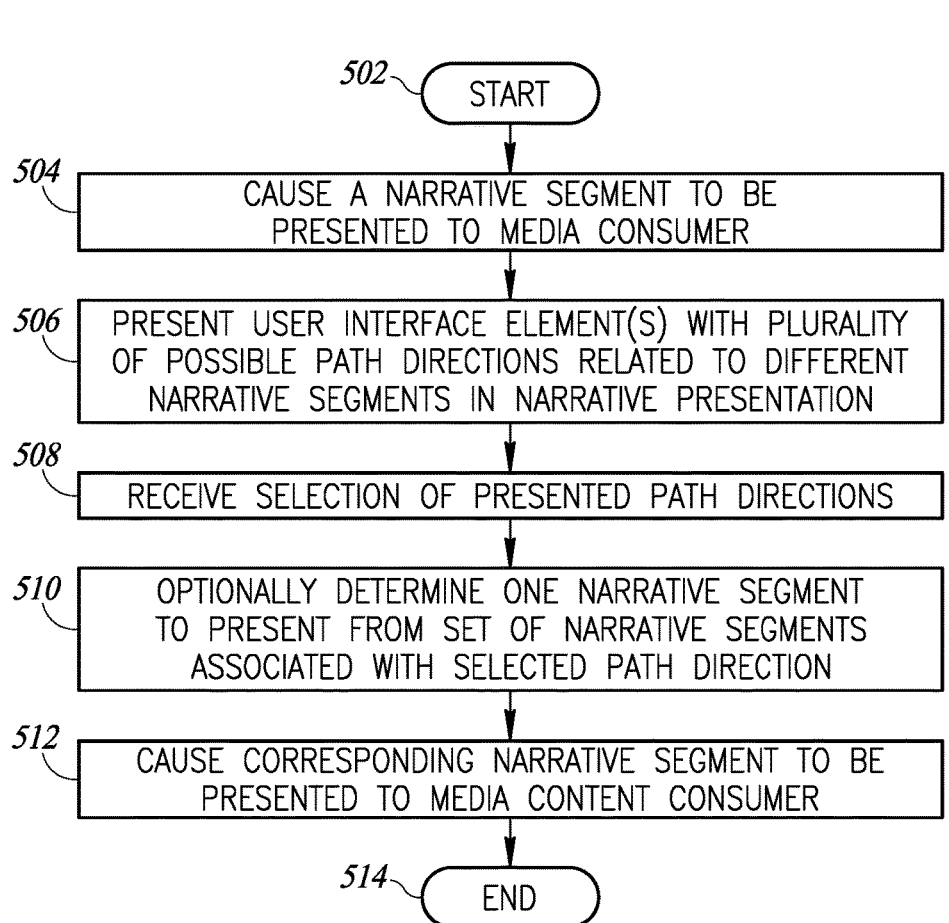
FIG. 5 is a flow diagram of a method of operation of a system to present a narrative segment to a media content consumer, according to at least one illustrated implementation.

FIG. 5 shows a high-level method 500 of operation of a system to present narrative segments 202 to a media content consumer 130, according to at least one implementation. The method 500 may be executed by one or more processor-enabled devices, such as, for example, the media content consumer processor-based device 132 and/or a networked server(s), such as Webserver 160. In some implementations, the method 500 may be executed by multiple such processor-enabled devices. The method 500 starts at 502 in which a narrative presentation 164 is being presented to a media content consumer 130.

At 504, at least one component (e.g., processor) of the system can cause a presentation of a narrative segment 202 of a narrative presentation 164 to a media content consumer 130. For example, the at least one component can stream a narrative segment to a media content consumer device. Also for example, an application executing on a media content consumer device may cause a presentation of a narrative segment via one or more output components (e.g., display, speakers, haptic engine) of a media content consumer device. The narrative segment may be stored in non-volatile memory on the media content consumer device, or stored externally therefrom and retrieved or received thereby, for example via a packet delivery protocol. The presented narrative segment may, for example, be a first narrative segment of the particular production (e.g., narrative presentation), which may be presented to all media content consumers of the particular production, for example to establish a baseline of a narrative. At 506, at least one component (e.g., processor) of the system can cause a presentation of one or more user interface elements, denominated as a narrative prompts 204, to a media content consumer 130. Such may be executed at various defined points during the narrative presentation 164. Such narrative prompts 204 may occur, for example, at or towards the end of a narrative segment 202 and may include a plurality of icons or other content consumer selectable elements that each represent a different narrative path that the media content consumer 130 can select to proceed with the narrative presentation 164.

As described elsewhere herein, specific implementations may advantageously include in the narrative prompts 204 an image from a respective narrative segment that corresponds to the respective narrative prompts 204. As described elsewhere herein, specific implementations may advantageously present the narrative prompts 204 while a current narrative segment is still being presented or played (i.e., during presentation of a sequence of a plurality of images of the current narrative segment), for example as a separate layer (overlay, underlay) for a layer in which the current narrative segment is presented. As described elsewhere herein, specific implementations may advantageously format the narrative prompts 204 to mimic a look and feel of the current narrative segment, for instance using intrinsic and extrinsic parameters of the camera(s) or camera(s) and lens combination with which the narrative segment was filmed or recorded. As described elsewhere herein, specific implementations may advantageously apply various effects in two- or three-dimensions to move the narrative prompts 204 either with, or with respect to, images in the current narrative segment. Intrinsic characteristics of a camera (e.g., camera and lens combination) can include, for example one or more of: a focal length, principal point, focal range, aperture, lens ratio or f-number, skew, depth of field, lens distortion, sensor matrix dimensions, sensor cell size, sensor aspect ratio, scaling, and, or distortion parameters. Extrinsic characteristics of a camera (e.g., camera and lens combination) can include, for example one or more of: a location or position of a camera or camera lens combination in three-dimensional space, an orientation of a camera or camera lens combination in three-dimensional space, or a viewpoint of a camera or camera lens combination in three-dimensional space. A combination of a position and an orientation is referred to herein and in the claims as a pose.

Each of the narrative paths may result in a different narrative segment 202 being presented to the media content consumer 130. The presentation of the available narrative paths and the narrative prompt may be caused by an application program being executed by one or more of the media content consumer processor-based device 132 and/or networked servers, such as Webserver 160.

At 508, at least one component (e.g., processor) of the system receives a signal that represents the selection of the desired narrative path by the media content consumer 130. For example, the signal can be received at a media content consumer device, which is local to and operated by the media content consumer 130. For example, where the narrative segments are stored locally at the media content consumer device, the received signal can be processed at the media content consumer device. Also for example, the signal can be received at a server computer system from the media content consumer device, the server computer system which is remote from the media content consumer and the media content consumer device. For example, where the narrative segments are stored remotely from the media content consumer device, the received signal can be processed remotely, for instance at the server computer system.

The system may optionally use the selection of a narrative path as collected information that characterizes the media content consumer 130 or preferences or predilections of the media content consumer 130. For example, in some implementations, each of the possible narrative path directions at a point (e.g., decision point) in a narrative may have an associated character which may be presented as part of a narrative prompt 204. For example, one narrative path may be indicated via a first user selectable icon visually or textually associated with a first character (CHAR A) and/or a first sub-title or synopsis, whereas another narrative path available at the point (e.g., decision point) may be indicated via a second user selectable icon visually or textually associated with a second character (CHAR B) and/or a second sub-title or synopsis, and optionally presented as part of a narrative prompt 204. For instance, at a given point (e.g., decision point), the media content consumer may be presented with a narrative prompt 204 including two or more choices for the narrative path direction, one choice being to follow CHAR A and the other choice to follow CHAR B, each choice represented by a respective user selectable icon. Each interaction by a media content consumer 130 via a narrative prompt 204 may therefore be used to determine the possible preferences of the media content consumer 130. As such, a media content consumer 130 may frequently choose narrative paths CHAR A such that a preference for CHAR A may be indicated on the collected information associated with that media content consumer 130. The first character CHAR A may be associated with certain traits (e.g., cold, calculating, action), while the second character CHAR B may be associated with other traits (e.g., warm, thoughtful, avoids confrontation). In some implementations, such collected information for the media content consumer 130 may be compared to the collected information from other media content consumer 130 who also chose CHAR A to determine other possible preferences, such as for type or brand of drink, or type or brand of car, for the media content consumer 130. Such determinations may be based, for example, upon the other collected information (e.g., type or brand of drink, or type or brand of car) associated with media content consumer 130 who chose to follow CHAR A, and may be strengthened to the extent that the media content consumer 130 chooses to follow CHAR A at multiple narrative prompts 204.

Each of the possible narrative paths may have a specific associated narrative segment or sequence of narrative segments. Alternatively, each of the possible narrative paths may have a set of two or more associated "alternative" narrative segments 202 from which the system can autonomously select based on collected information for presentation to the media content consumer 130. Such selections may be based on the collected information for the media content consumer 130. For example, a set of narrative segments may include two, three, or more possible narrative segments 202 that may be presented to the media content consumer 130, dependent on the autonomous selection by the system based on the collected information that characterizes the particular media content consumer 130 or particular group to which the particular media content consumer 130 belongs. The set of "alternative" narrative segments 202 associated with each narrative path may be previously defined, such as, for example by the content creator 110 and/or content editor 120 when the narrative presentation 164 was being developed.

Optionally at 510, at least one component (e.g., processor) of the system autonomously determines the particular narrative segment 202 from the set of two or more "alternative" narrative segments to present to the media content consumer 130 based at least in part on collected information that characterizes the media content consumer 130 or a group in which the media content consumer 130 can be classified. The at least one component may determine the particular narrative segment 202 to present without any further input by the media content consumer 130. In some implementations, for example, each of the narrative segments 202 may have a set of selection parameters associated with the narrative segment 202, in which each selection parameter may have an associated value. The values for one or more of the selection parameters may be compared against one or more values in the collected information associated with the media content consumer 130 to determine the narrative segment 202 to present. Such a determination may be performed by a processor, or by an application program being executed by one or more processor-enabled components, such as the media content consumer processor-based device 132 and/or a networked server, such as Webserver 160.

The determination at 510 may be based on one or more criteria. For example, in some implementations, the determination may be based upon the narrative segment 202 with selection parameter values having the most exact matches or strongest correlation to the collected information associated with the media content consumer 130; may be based upon the narrative segment 202 with selection parameter values having the closest overall match or strongest correlation to the collected information associated with the media content consumer 130; may be based upon the narrative segment 202 with selection parameter values having a highest or lowest weighted score when compared to the collected information associated with the media content consumer 130; or may be based upon some other type of comparison.

Determining the narrative segment 202 from the set of narrative segments to present may be used to customize or tailor the narrative segment 202 and narrative presentation 164 to the media content consumer 130. For example, each of the narrative segments 202 within the set of narrative segments may present the same plotline, story arc, and characters to the media content consumer 130, but may be used to customize the details depicted in the respective narrative segments 202. In such an implementation, for example, the props, settings, clothing, background, or other features may be modified across the narrative segments 202 of a given set of narrative segments such that the selection of the narrative segment from the set of narrative segments for a given media content user selection at a given point (e.g., decision point) may be determined based upon, for example, the collected information associated with the media content consumer 130. Such may be used to customize product placements or advertisements across the narrative segments 202 in a set of narrative segments. Thus, for example, in a first narrative segment, a sports drink such as Gatorade® may be depicted, whereas in a second narrative segment a bottled water such as Dasani® may be depicted, in a third narrative segment a bottle of a brand of beer may be depicted, and in a fourth narrative segment a bottle of a brand of wine or liquor may be depicted. Also, for example, in a first narrative segment, a car of a first brand may be depicted, whereas in a second narrative segment a car of a second brand may be depicted, in a third narrative segment a truck of a third brand may be depicted, and in a fourth narrative segment a truck of a fourth brand may be depicted. As such, the ability to customize the features of a narrative segment 202 may advantageously be used to target product placements of commercial products and/or other types of advertisements towards the media content consumers 130 being presented with the narrative presentation 164. In some implementations, the presentation of a previous narrative segment 202 with a particular product or commercial may be considered in determining at 508 a subsequent narrative segment 202 to present to the media content consumer 130.

At 512, at least one component (e.g., processor) of the system causes a presentation of a corresponding narrative segment 202 to the media content consumer 130. The corresponding narrative segment 202 can be a specific narrative segment identified by the received narrative path selection. Alternatively, the corresponding narrative segment 202 can be a narrative segment determined at 508, for instance a narrative segment autonomously selected by the system from a set of two or more "alternative" narrative segments associated with the received narrative path selection.

Such a presentation may be made, for example, via any one or more types of output devices, such as a video/computer, screen or monitor, speakers or other sound emitting devices, displays on watches or other types of wearable computing device, and/or electronic notebooks, tablets, or other e-readers. For example, a processor of a media content consumer device may cause the determined narrative segment 202 to be retrieved from on-board memory, or alternatively may generate a request for the narrative segment to be streamed from a remote memory or may otherwise retrieve from a remote memory or storage, and placed in a queue of a video memory. Alternatively or additionally, a processor of a server located remotely from the media content consumer device may cause a streaming or pushing of the determined narrative segment 202 to the media content consumer device, for instance for temporary placement in a queue of a video memory of the media content consumer device.

The method 500 ends at 514 until invoked again. The method 500 may be invoked, for example, each time a narrative prompt 204 appears during a narrative presentation 164.

Figure 6:
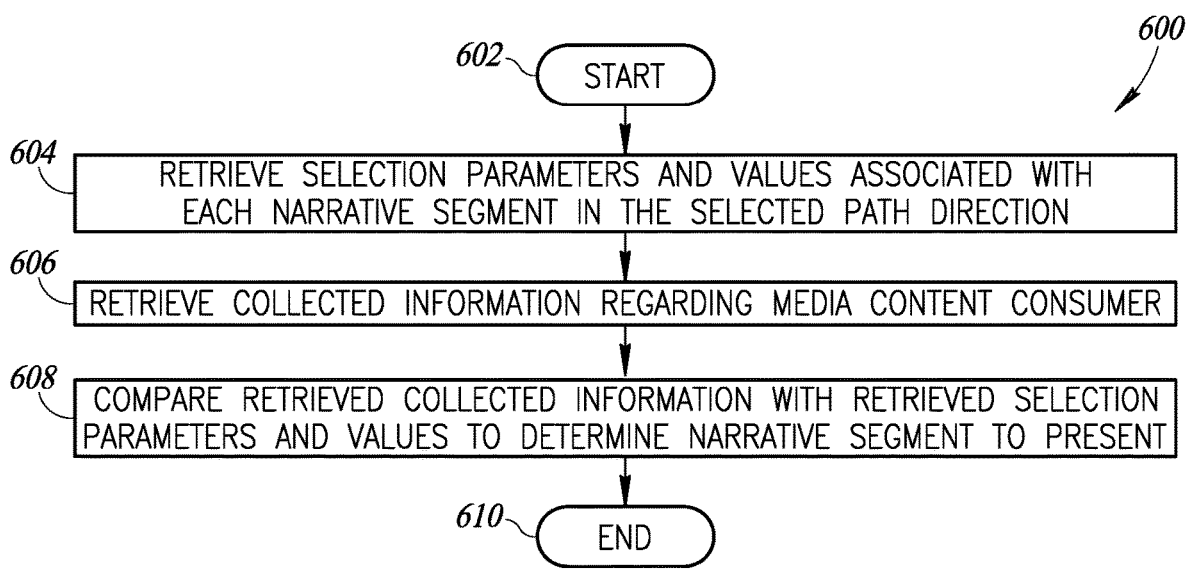
FIG. 6 is a flow diagram of a method of operation of a system to autonomously determine a narrative segment out of a plurality of narrative segments for presenting to a media content consumer, according to at least one illustrated implementation.

FIG. 6 shows a method 600 of operation of a system to autonomously determine the narrative segment 202 from a set of two or more narrative segments 202 to present to a media content consumer 130, according to at least one illustrated implementation. The method 600 may be executed in performing the optional determination 510 of the method 500 (FIG. 5). The method 600 may be executed by one or more processor-enabled devices, such as, for example, the media content consumer processor-based device 132 and/or a networked server(s), such as Webserver 160. In some implementations, the method 600 may be executed by multiple such processor-enabled devices.

The method 600 starts at 602 at which point a media content consumer 130 has selected a narrative path from a narrative prompt 204. The selected narrative path may have a set of associated narrative segments 202, at least one of which may be presented to the media content consumer 130.

At 604, at least one component (e.g., processor) of the system retrieves the selection parameters and values associated with the narrative segments in the selected narrative path. The selection parameters and values may be stored, for example, on the media content consumer processor-based device 132 and/or networked servers, such as Webserver 160. The selection parameters for each narrative segment 202 may be based on desired or appropriate characteristics of a media content consumer 130 who will be presented with the narrative segment 202. For example, the selection parameters may be based upon demographic information for media content consumers 130, prior viewing history of narrative presentations 164, prior selection history at previous narrative prompts, browsing history for Websites, and any other information related to media content consumers 130. In some implementations, each narrative segment 202 within a set of narrative segments may include the same selection parameters. In such an implementation, the values for each selection parameter may be unique for each narrative segment 202 within the set of narrative segments. In some implementations, the values for at least some of the selection parameters may overlap or be identical for at least some of the narrative segments 202 within the set of narrative segments. In some implementations, the narrative segments 202 within a set of narrative segments may have selection parameters within the set of selection parameters that partially or have no overlap. The set of selection parameters and the values assigned to each selection parameter may be previously defined, such as, for example by the content creator 110 and/or content editor 120 when the narrative presentation 164 was being developed.

At 606, at least one component (e.g., processor) of the system retrieves the collected information related to the media content consumer 130 who selected the narrative path. The collected information may be stored, for example, on the media content consumer processor-based device 132 and/or networked servers, such as Webserver 160. The collected information may include, for example, demographic information for the media content consumer 130, prior viewing history of narrative presentations 164, prior selection history at previous narrative prompts, browsing history for Websites by the media content consumer 130, and any other information related to the media content consumer 130. The collected information may include the types of narrative segments 202 and/or the content of the narrative segments 202 (e.g., product placements or commercials) previously presented to the media content consumer 130. The types of collected information may be previously defined, such as, for example by the content creator 110 and/or content editor 120 when the narrative presentation 164 was being developed.

At 608, at least one component (e.g., processor) of the system compares the retrieved selection parameters and values for each of the narrative segments 202 within the set of narrative segments to the retrieved collected information regarding the media content consumer 130 to determine the narrative segment 202 from the set of narrative segments to present to the media content consumer 130. Such a comparison may include, for example, comparing individual selection parameters to corresponding collected information to determine if a match exists. In some implementations, the narrative segment 202 having the selection parameters and values that match the collected information from the media content consumer 130 will be presented. In some implementations, the narrative segment 202 having the selection parameters and values that most closely match the collected information from the media content consumers 130 will be presented. In some implementations, the closest match may be determined using a sum of weighted values associated with each of the selection parameters that match the collected information. Other comparing and matching methods may be implemented to determine the narrative segment 202 from the set of narrative segments to present to the media content consumer 130.

The method 600 ends at 610 when the determined narrative segment 202 is retrieved and presented to the media content consumer 130.

While generally discussed in terms of a prompt being presented to the user at various points (e.g., decision points) during presentation of the narrative, the system may employ other approaches. For example, the user may make one or more selections before the start of the presentation of the narrative, or after presentation of a first segment of the narrative. The first segment may, for example, be a standardized segment which is presented to all media content consumers 130 who start the given narrative presentation. Alternatively, the first segment may be custom selected for a particular media content consumer 130 or group of media content consumers 130 by a processor-based device, for example custom selected based on demographic information or narratives previously viewed by the respective media content consumer(s) 130 or selections made by the respective media content consumer(s) 130 during those previously viewed narratives (i.e., selections once removed from a present narrative presentation, twice removed from a present narrative presentation, etc.). In this way, interruptions of the narrative presentation may be minimized or even completely avoided.

Figure 7:
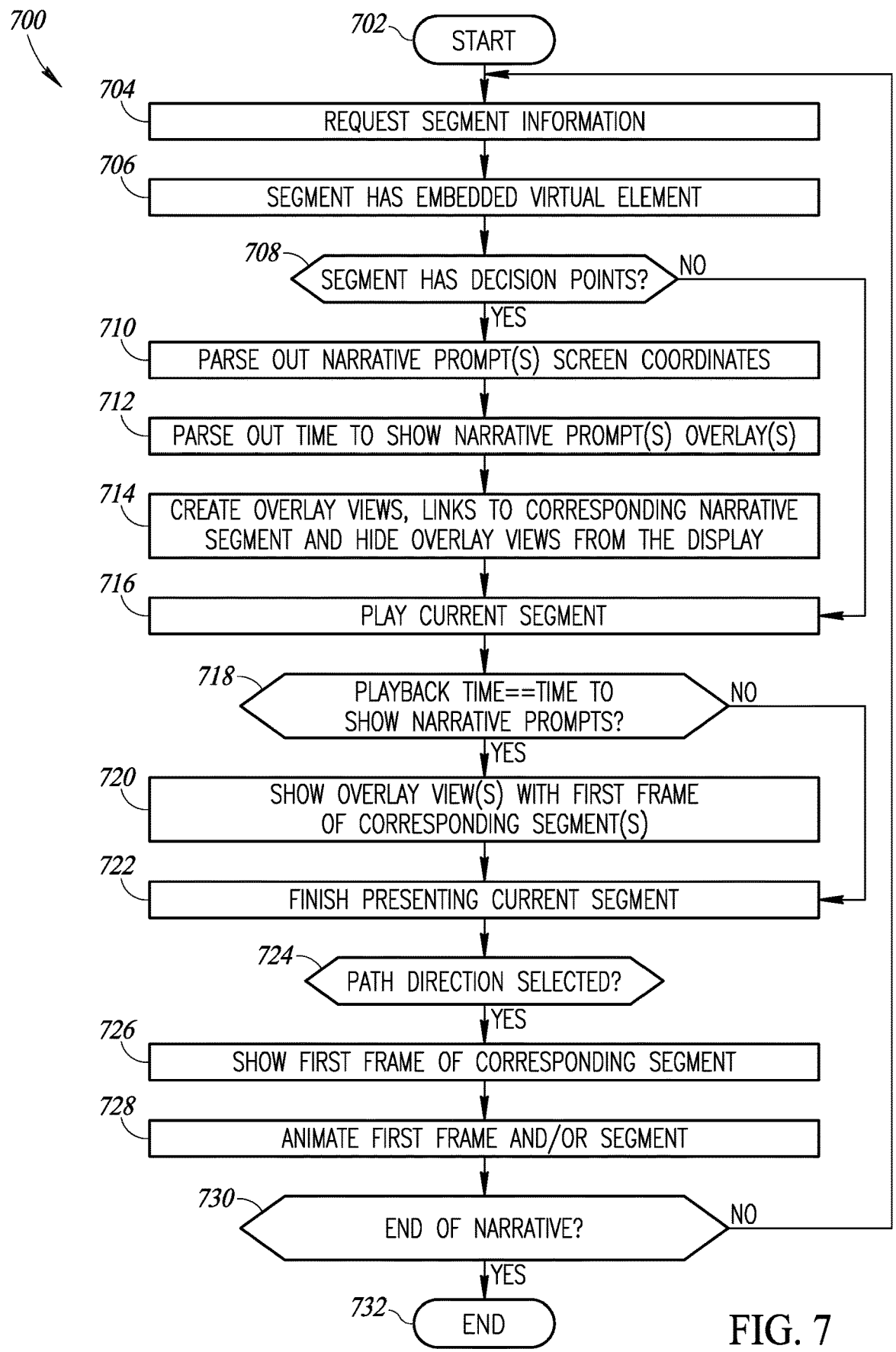
FIG. 7 is a flow diagram of a first method of operation of a system to present narrative segments along with user interface elements or narrative prompts at various defined points during the narrative presentation while continuing to present a current narrative segment, according to at least one illustrated implementation.

FIG. 7 shows a first method 700 of operation of a system to present narrative segments along with user interface elements or narrative prompts at various defined points during the narrative presentation while continuing to present a current narrative segment, according to at least one illustrated implementation. The method 700 may be executed by one or more processor-enabled devices, such as, for example, the media content consumer processor-based device 132 and/or a networked server(s), such as Webserver 160. In some implementations, the method 700 may be executed by multiple such processor-enabled devices.

The method 700 starts at 702, for example in response to a starting up of a program, a user input, a powering of a device, or a call from a calling routine.

At 704, at least one component (e.g., processor) of the system requests narrative segment information. For example, a processor of a media content consumer device and, or a server computer system may request information associated with a first or a current narrative segment (e.g., video node). Such may be stored as data associated with the respective narrative segment or metadata of the respective narrative segment. Such information may identify the particular narrative segment, identify the narrative itself, identify valid subsequent path directions from the current narrative segment, identify characters appearing in the current narrative segment, etc.

At 706, at least one component (e.g., processor) of the system identifies embedded virtual elements in the respective narrative or narrative segment, if any. For example, a processor of a media content consumer device and, or a server computer system may determine whether the narrative or narrative segment includes, for example, a progress bar, a gradient view, and, or title labels (i.e. titles). These elements may be denominated as virtual elements since they are generated by the application. The processor of a media content consumer device and, or a server computer system may check information (e.g., data structure, metadata) logically associated with the narrative or narrative segment, or may scan the narrative or narrative segment itself for virtual elements.

At 708, at least one component (e.g., processor) of the system determines whether the respective narrative segment has one or more decision points (e.g., choice moments). For example, a processor of a media content consumer device and, or a server computer system may query information or metadata associated with a current narrative segment to determine whether there is one or more point during the current narrative segment at which a decision can be made as to which of two or more path directions are to be taken through the narrative presentation. For example, a processor of a media content consumer device and, or a server computer system may request information associated with the current narrative segment (e.g., video node). Such may be stored as data associated with the respective narrative segment or metadata of the respective narrative segment.

If it is determined at 708 that the current narrative segment has one or more decision points, then at 710 at least one component (e.g., processor) of the system determines or parses out a set of screen or frame coordinates for one or more narrative prompts to be presented, which allow a media content consumer to select a path direction. For example, a processor of a media content consumer device and, or a server computer system may retrieve a set of defined spatial coordinates for the specific current narrative segment, or a set of defined spatial coordinates that are consistent for each of the narrative segments the comprise a narrative presentation. The processor of a media content consumer device and, or a server computer system may, for example, determine a size and location of a window in which the segment is to be presented, relative to an overall size of a display or screen of a content media consumer device on which the narrative presentation is being presented or will be presented. The processor of a media content consumer device and, or a server computer system may, for example, determine a location at which to present the narrative prompt(s) in terms of the overall display or screen based on the size and location of the window in which the segment is to be presented and a location that is local to the frame of the narrative segment.

At 712, at least one component (e.g., processor) of the system determines or parses out a time to present the narrative prompts (e.g., choice moment overlays). For example, a processor of a media content consumer device and, or a server computer system may retrieve a set of defined time or temporal coordinates for the specific current narrative segment, or a set of defined time or temporal coordinates that are consistent for each of the narrative segments the comprise a narrative presentation.

At 714, at least one component (e.g., processor) of the system creates narrative prompt overlay views with links to corresponding narrative segments, for example narrative segments corresponding to the available path directions that can be chosen from the current narrative segment. The narrative prompt overlay are initially set to be invisible or otherwise hidden from view via the display or screen on which the narrative presentation will be, or is being, presented. For example, a processor of a media content consumer device and, or a server computer system can generate a new layer, in addition to a layer in which a current narrative segment is presented. The new layer includes a user selectable element or narrative prompt, and preferably includes a first frame or image of the narrative segment to which the respective user interface element or narrative prompt is associated (e.g., the narrative segment that will be presented subsequent to the current narrative segment when the respective narrative prompt is selected). The processor of a media content consumer device and, or a server computer system can employ a defined framework or narrative prompt structure that is either specific to the narrative segment, or that is consistent across narrative segments that comprise the narrative presentation. The defined framework or structure may be pre-populated with the first image or frame of the corresponding narrative segment. Alternatively, the processor of a media content consumer device and, or a server computer system can retrieve the first image or frame of the corresponding narrative segment and incorporate such in the defined framework or structure when creating the new layer. The processor of a media content consumer device and, or a server computer system can set a parameter or flag or property of the new layer to render it initially invisible.

The at least one component (e.g., processor) of the system the then passes control to 716, where the at least one component causes a presentation or playing of the current narrative segment (e.g., video segment) on a corresponding layer (e.g., narrative presentation layer).

If the current narrative segment is determined at 708 to not have decision points (e.g., choice moments), then the at least one component (e.g., processor) of the system passes control directly 716, where the at least one component causes a presentation or playing of the current narrative segment (e.g., video segment) on a corresponding layer (e.g., narrative presentation layer).

At 718, at least one component (e.g., processor) of the system monitors the presentation or playing of the current narrative segment to determine whether a decision point has been reached. For example, a processor of a media content consumer device and, or a server computer system can, for example determine whether a playback time in the current segment equals a defined time (e.g., temporal coordinate) to present one or more narrative prompts (e.g., choice moment icons).

In response to a determination at 718 that a decision point has been reached, the at least one component (e.g., processor) of the system at 720 causes a presentation of the narrative prompt overlay(s) including an image or frame of a respective narrative segment associated with the respective narrative prompt. For example, a processor of a media content consumer device and, or a server computer system may change a parameter or flag or property associated with the narrative prompt overlay(s) to render such visible (e.g., change property of layer from being invisible to visible). The narrative prompt overlay(s) may be presented with, or otherwise include an indication of a progress (e.g., time remaining until end of the currently presented narrative segment, time remaining for choice) and, or a name of the corresponding path direction, narrative segment or other related information. While described and illustrated with the narrative prompt overlay including a single image or single frame of the corresponding narrative segment, in some implementation the narrative prompt overlay may include a sequence or sampling of two or more images or frames of the corresponding narrative segment, being played.

At 722, at least one component (e.g., processor) of the system causes continued presenting or playing the current narrative segment. For example, a processor of a media content consumer device and, or a server computer system may cause continued presenting or playing the current narrative segment on one layer, while causing a concurrent display of the narrative prompts along with the images or frames of the narrative segments associated with the narrative prompts. For instance, the at least one component may cause continued presenting or playing the current narrative segment until the current narrative segment ends. Also for instance, the at least one component may cause continued presenting or playing the current narrative segment until the current narrative segment ends, even if a user input or selection is received before the completion or end of presenting the current narrative segment. In some implementation, the at least one component may set, and, or monitor, a timer during which a user input or selection is to be received. In such an implementation, the at least one component may autonomously select a path direction in absence of user input or selection within a defined period, for instance as indicated by expiration of the timer. To be clear, the narrative prompts correspond to selectable path directions, thus the associated narrative segments are narrative segments other than the narrative segment currently being presented, and hence the images of frames of narrative segments associated with the narrative prompt(s) are different from those of the narrative segment currently being presented.

In response to a determination at 718 that a decision point has not been reached, the at least one component (e.g., processor) of the system passes control directly to 722 wherein the at least one component causes continued presenting or playing the current narrative segment. For example, a processor of a media content consumer device and, or a server computer system may cause continued presenting or playing the current narrative segment on one layer, while causing a layer with the narrative prompts to remain invisible.

At 724, at least one component (e.g., processor) of the system monitors for a signal that indicates that a user input has been received. For example, a processor of a media content consumer device and, or a server computer system may monitor for a signal that indicates that a narrative prompt or user selectable icon or other user interface element has been selected.

In response to a determination at 724 that a user input has been received, the at least one component (e.g., processor) of the system at 726 causes a presentation of at least a first image or frame of the narrative segment corresponding to the selected one of the narrative prompts. For example, a processor of a media content consumer device and, or a server computer system can cause a presentation of a first image or frame of a narrative segment to which the selected narrative prompt overlay is linked via a data structure or hyperlink. Additionally, the processor of a media content consumer device and, or a server computer system may cause a presentation of a sequence of subsequent frames of the narrative segment corresponding to the selected narrative prompt or direction to occur, for example presenting a sequence of frames or images while performing an animation (728).

At 728, at least one component (e.g., processor) of the system causes an animation of the at least first image or frame of the narrative segment corresponding to the selected one of the narrative prompts. For example, a processor of a media content consumer device and, or a server computer system may cause the image(s) or frame(s) of the narrative segment corresponding to the selected one of the narrative prompts to expand to cover a wider area of the display or screen, for instance sequentially expanding to cover or occupy a majority of or even an entire area of a display or screen, or for instance sequentially expanding to cover or occupy a majority of or even an entire area of a window in which the narrative presentation is being presented. For example, the at least one component can sequentially update an image buffer to cause successive images or frames of the narrative to occupy an increasing larger area. Such may include increasing a resolution, or even interpolating, as the covered area increases. Alternatively, the processor of a media content consumer device and, or a server computer system can animate the first frame or image, delaying a presentation of subsequent frames or images of the narrative segment until the animation is complete.

At 730, at least one component (e.g., processor) of the system determines whether an end of the narrative presentation has been reached. For example, a processor of a media content consumer device and, or a server computer system at check a time flag, time stamp or temporal coordinate of a current frame of the narrative segment currently being presented. In response to a determination that the end of the narrative presentation has not been reached, the at least one component (e.g., processor) of the system returns control to 704. In response to a determination that the end of the narrative presentation has been reached, the at least one component (e.g., processor) of the system passes control to 732.

The method 700 ends at 732 until invoked again. The method 700 may be invoked, for example, each time a narrative presentation 164 is selected for presentation or view.

Figure 8A:
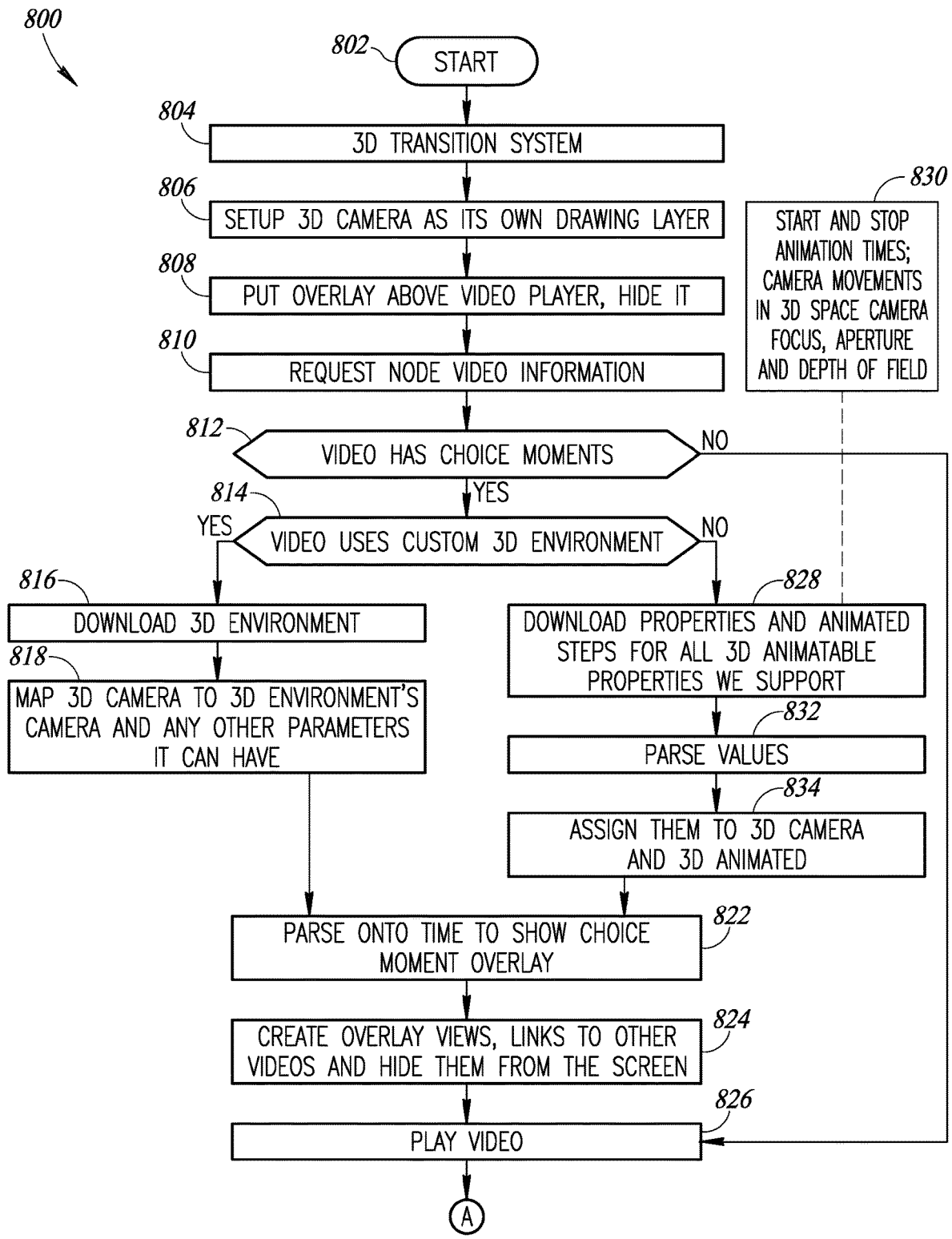
FIGS. 8A and 8B are a flow diagram of a second method of operation of a system to present narrative segments along with user interface elements or narrative prompts at various defined points during the narrative presentation while continuing to present a current narrative segment, according to at least one illustrated implementation.
Figure 8B:
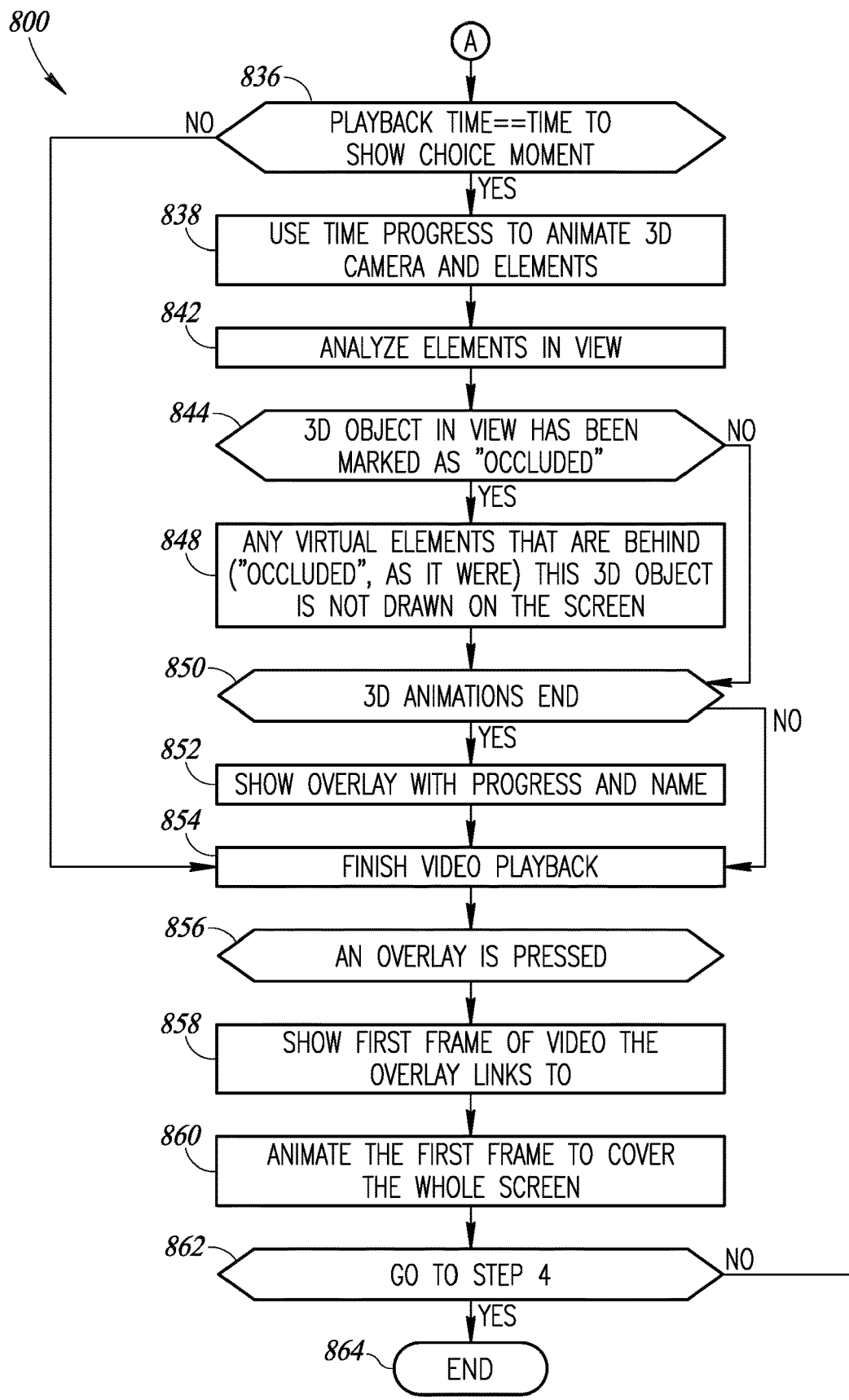

FIGS. 8A and 8B show a second method 800 of operation of a system to present narrative segments along with user interface elements or narrative prompts at various defined points during the narrative presentation while continuing to present a current narrative segment, according to at least one illustrated implementation. The method 800 may be executed by one or more processor-enabled devices, such as, for example, the media content consumer processor-based device 132 and/or a networked server(s), such as Webserver 160. In some implementations, the method 800 may be executed by multiple such processor-enabled devices.

The method 800 starts at 802, for example in response to a starting up of a program, a user input, a powering of a device, or a call from a calling routine.

At 804, at least one component (e.g., processor) of the system initializes a three-dimensional (3D) transition system. For example, a processor of a media content consumer device and, or a server computer system may perform an initialization process, for instance reading in parameters (e.g., animation start time, animation end time, camera depth of field, intrinsic characteristics or parameter, extrinsic characteristic or parameters). In some implementations, an entire 3D animation file is downloaded. For instance an entire COLLADA file) is downloaded when the narrative segment (e.g., video clip) is loaded. COLLADA is a standard file format for 3D objects and animations.

At 806, at least one component (e.g., processor) of the system causes one or more virtual three-dimensional (3D) cameras to be set up on respective ones of one or more layers, denominated as 3D virtual camera layers, the respective 3D virtual camera layers being separate from a layer on which narrative segments are presented or are to be presented. For instance, a processor of a media content consumer device and, or a server computer system can create one or more respective drawing or rendering layers. One or more narrative segments may have been filmed or captured with a physical camera, for instance with a conventional film camera (e.g., Red Epic Dragon digital camera, Arri Alexa digital camera), or with a 3D camera setup. Additionally or alternatively, one or more narrative segments may be may be computer generated animation (CGI) or other animation. One or more narrative segments may include special effects interspersed or overlaid with live action.

At 808, at least one component (e.g., processor) of the system causes the 3D virtual camera layers to overlay a layer in which the narrative segments are presented (e.g., overlay video player), with the 3D virtual camera layer set to be invisible or hidden from view. For example, a processor of a media content consumer device and, or a server computer system may set a parameter or flag or property of the 3D virtual camera layer or a narrative presentation layer to indicate which overlay the other with respect to a viewer or media content consumer point of view.

At 810, at least one component (e.g., processor) of the system requests narrative segment information. For example, a processor of a media content consumer device and, or a server computer system may request information associated with a first or a current narrative segment (e.g., video node). Such may be stored as data in a data store logically associated with the respective narrative segment or may comprise metadata of the respective narrative segment.

At 812, at least one component (e.g., processor) of the system determines whether the respective narrative segment has one or more decision points (e.g., choice moments). For example, a processor of a media content consumer device and, or a server computer system may query information or metadata associated with a current narrative segment to determine whether there is one or more points during the current narrative segment at which a decision can be made as to which of two or more path directions are to be taken through the narrative presentation. For example, a processor of a media content consumer device and, or a server computer system may request information associated with the current narrative segment (e.g., video node). Such may be stored as data in a data store logically associated (e.g., pointer) with the respective narrative segment or may comprise metadata of the respective narrative segment.

At 814, at least one component (e.g., processor) of the system determines whether the narrative presentation or the narrative segment employs a custom three-dimensional environment. For example, a processor of a media content consumer device and, or a server computer system can query a data structure logically associated with the narrative presentation or the narrative segment or query metadata associated with the narrative presentation or the narrative segment.

In response to a determination at 814 that the narrative presentation or the narrative segment employs a custom three-dimensional environment, at 816 the at least one component (e.g., processor) of the system causes a specification of the custom 3D environment to be downloaded. For example, a processor of a media content consumer device and, or a server computer system may retrieve a custom 3D environment specification or information from a data store, stored in nontransitory processor-readable media either locally, and, or remotely from the component.

At 818, at least one component (e.g., processor) of the system maps one or more 3D virtual cameras to a three-dimensional environment. For example a processor of a media content consumer device and, or a server computer system can map or otherwise initialize one or more 3D virtual cameras using a set of intrinsic and, or, extrinsic characteristics or parameters. Intrinsic and, or, extrinsic characteristics or parameters can, for example, include one or more of: animation start time and stop time for an entire animation. Intrinsic and, or, extrinsic characteristics or parameters for the camera can, for example, include one or more of: a position and an orientation (i.e. pose) of a camera at each of a number of intervals; a depth of field or changes in a depth of field of a camera at each of a number of intervals; an aperture of or changes in an aperture of a camera at each of a number of intervals; a focal distance or focal length of or changes in a focal distance or focal length of a camera at each of a number of intervals. Notably, intervals can change in length, for instance depending on how camera movement is animated. Intrinsic and, or, extrinsic characteristics or parameters for objects (e.g., virtual objects), can, for example, includes: a position and an orientation (i.e. pose) of an object at each of a number of intervals. Virtual objects can, for example, take the form of narrative prompts, in in particular narrative prompts that take the form of, or otherwise include, a frame or image from a respective narrative segment what will be presented in response to a section of the respective narrative prompt. These parameters can all be extracted from a COLLADA file where such is used.

The 3D environment may have animations to the camera and narrative prompts embedded in the 3D environment. As an example of the mapping, a processor of a media content consumer device and, or a server computer system may cause the 3D virtual camera to track with a tracking of the physical camera across a scene. For instance, if between a first time 0.2 seconds into the narrative segment and a second time 1.8 seconds into the narrative segment we're supposed to move the camera 30 units to the right, then upon reaching the appropriate time (e.g., 0.2 seconds into the narrative segment) the system causes the 3D virtual to move accordingly. Such can advantageously be used to sweep or otherwise move the narrative prompts into, and across, a scene of the current narrative segment while the current narrative segment continues to be presented or play (i.e., continue to successively present successive frames or images of the narrative segment).

If it is determined at 812 that the current narrative segment has one or more decision points, then at 822 at least one component (e.g., processor) of the system determines or parses out a time to present the narrative prompts (e.g., choice moment overlays). For example, a processor of a media content consumer device and, or a server computer system may retrieve a set of defined time or temporal coordinates for the specific current narrative segment, or a set of defined time or temporal coordinates that are consistent for each of the narrative segments the comprise a narrative presentation.

At 824, at least one component (e.g., processor) of the system creates narrative prompt overlay views with links to corresponding narrative segments, for example narrative segments corresponding to the available path directions that can be chosen from the current narrative segment. The narrative prompt overlay are initially set to be invisible or otherwise hidden from view via the display or screen on which the narrative presentation will be, or is being, presented. For example, a processor of a media content consumer device and, or a server computer system can generate a new layer, in addition to a layer in which a current narrative segment is presented. The new layer includes a user selectable element or narrative prompt, and preferably includes a first frame or image of the narrative segment to which the respective user interface element or narrative prompt is associated (e.g., the narrative segment that will be presented subsequent to the current narrative segment when the respective narrative prompt is selected). The processor of a media content consumer device and, or a server computer system can employ a defined framework or narrative prompt structure that is either specific to the narrative segment, or that is consistent across narrative segments that comprise the narrative presentation. The defined framework or structure may be pre-populated with the first image or frame of the corresponding narrative segment. Alternatively, the processor of a media content consumer device and, or a server computer system can retrieve the first image or frame of the corresponding narrative segment and incorporate such in the defined framework or structure when creating the new layer. The processor of a media content consumer device and, or a server computer system can set a parameter or flag or property of the new layer to render the new layer initially invisible. The at least one component (e.g., processor) of the system then passes control to 826, where the at least one component causes a presentation or playing of the current narrative segment (e.g., video segment) on a corresponding layer (e.g., narrative presentation layer).

If the current narrative segment is determined at 812 to not have decision points (e.g., choice moments), then the at least one component (e.g., processor) of the system passes control directly 826, where the at least one component causes a presentation or playing of the current narrative segment (e.g., video segment) on a corresponding layer (e.g., narrative presentation layer).

If the narrative presentation or current narrative segment is determined at 814 to not use a custom three-dimensional (3D) environment, control passes directly to 828. At 828, at least one component (e.g., processor) of the system retrieves properties and animation operations or instructions for all supported 3D animatable properties. For example, a processor of a media content consumer device and, or a server computer system can download properties and animation operations or instructions from a local data store, and, or, from a remote data store, stored on transitory processor-readable media.

As an example of the retrieval, at 830 at least one component (e.g., processor) of the system retrieves or downloads one or more of a start animation time, a stop animation time, a duration of animation time, one or more specification of camera movements in three-dimensional space, one or more camera focus values, one or more camera aperture values, one or more lens values (e.g., focal length, focal range, lens, ratio or f-number), and, or one or more depth of field values, one or more poses of the camera or camera and lens combination.

At 832, at least one component (e.g., processor) of the system parses the retrieved values. With the 3D system every action is timed and interpolated. Thus, the system must determine what is to be presented at which times time in during the animation. For example, the system may determine a position and/or orientation (e.g., pose) of a virtual 3D camera at each of a plurality of intervals during the animation. For example, the system may determine a position and/or orientation (e.g., pose) of one or more narrative prompts and, or frames of the subsequent narrative segments that are presented as or as part of the narrative prompts, at each of a plurality of intervals during the animation. For example, the system may determine a focal distance or focal length of the 3D virtual camera, at each of a plurality of intervals during the animation. For instance, the focal distance or focal length allows control over how blurry or sharp the virtual 3D camera sees the virtual elements, so the focal distance or focal length of the virtual 3D camera can be used to blur a scene and then bring the scene into focus, or vice-versa. The system may determine other intrinsic and extrinsic characteristics for each of a plurality of intervals during the animation, allowing such to be used to achieve desired effects, for instance desired appearance and movement of one or more narrative prompts.

At 834, at least one component (e.g., processor) of the system assigns the parsed values to 3D virtual camera and, or the 3D animation. Control then passes to 822, and operation continues as described above.

At 836, at least one component (e.g., processor) of the system monitors the presentation or playing of the current narrative segment to determine whether a decision point has been reached. For example, a processor of a media content consumer device and, or a server computer system can, for example determine whether a playback time in the current segment equals a defined time (e.g., temporal coordinate) to present one or more narrative prompts (e.g., choice moment icons).

In response to a determination at 836 that a decision point has been reached, the at least one component (e.g., processor) of the system at 838 employs time progress of the presentation or playing of the narrative segment to animate 3D virtual camera and, or 3D virtual elements, for example synchronizing the animation with the movement of the physical camera related to the scene.

As an example of using the time progress, at least one component (e.g., processor) of the system cause the 3D virtual camera and 3D virtual elements to provide the illusion of movement. For example, the 3D virtual elements are animated to move as the camera perspective of the narrative segment presentation moves, for instance tracking the movement of the camera perspective as the camera perspective moves in three dimensional space.

At 842, at least one component (e.g., processor) of the system analyzes any virtual elements (e.g., 3D virtual elements) in the view. For example, a processor of a media content consumer device and, or a server computer system may check frame data to determine whether any 3D virtual elements would be in the frame or screen area that is to be displayed.

At 844, at least one component (e.g., processor) of the system determines whether any 3D virtual elements in the view have been identified as blocked or marked as occluded. For example, a processor of a media content consumer device and, or a server computer system can determine whether the scene to be rendered would occlude all or a portion of one or more 3D virtual elements.

At 848, at least one component (e.g., processor) of the system may avoid rendering any virtual elements (e.g., 3D virtual elements) or portions thereof that are behind or occluded, to prevent the occluded 3D virtual element or occlude portion thereof from being displayed.

At 850, at least one component (e.g., processor) of the system determines whether the 3D animations are finished, completed or at an end of the 3D animation. For example, a processor of a media content consumer device and, or a server computer system may query a 3D animation specification for a stop time for the respective 3D animation.

If it is determined at 850 that 3D animations have ended, then at 852 least one component (e.g., processor) of the system causes a presentation of the narrative prompt overlay(s) including an image or frame of a respective narrative segment associated with the respective narrative prompt. For example, a processor of a media content consumer device and, or a server computer system may change a parameter or flag associated with the narrative prompt overlay(s) to render such visible (e.g., change property of layer from being invisible to visible). The narrative prompt overlay(s) may be presented with, or otherwise include an indication of a progress (e.g., time remaining until end of the currently presented narrative segment, time remaining for choice) and, or a name of the corresponding path direction, narrative segment or other related information. While described and illustrated with the narrative prompt overlay including a single image or single frame of the corresponding narrative segment, in some implementation the narrative prompt overlay may include a sequence or sampling of two or more images or frames of the corresponding narrative segment, being played.

At 854, at least one component (e.g., processor) of the system causes continued presenting or playing the current narrative segment. For example, a processor of a media content consumer device and, or a server computer system may cause continued presenting or playing the current narrative segment on one layer, while causing a concurrent display of the narrative prompts along with the images or frames of the narrative segments associated with the narrative prompts. For instance, the at least one component may cause continued presenting or playing the current narrative segment until the current narrative segment ends. Also for instance, the at least one component may cause continued presenting or playing the current narrative segment until the current narrative segment ends, even if a user input or selection is received before the completion or end of presenting the current narrative segment. In some implementation, the at least one component may set, and, or monitor, a timer during which a user input or selection is to be received. In such an implementation, the at least one component may autonomously select a path direction in absence of user input or selection within a defined period, for instance as indicated by expiration of the timer. To be clear, the narrative prompts correspond to selectable path directions, thus the associated narrative segments are narrative segments other than the narrative segment currently being presented, and hence the images of frames of narrative segments associated with the narrative prompt(s) are different from those of the narrative segment currently being presented.

In response to a determination at 836, that a decision point has not been reached, the at least one component (e.g., processor) of the system passes control directly to 854 wherein the at least one component causes continued presenting or playing the current narrative segment. For example, a processor of a media content consumer device and, or a server computer system may cause continued presenting or playing the current narrative segment on one layer, while causing a layer with the narrative prompts to remain invisible.

At 856, at least one component (e.g., processor) of the system monitors for a signal that indicates that a user input has been received. For example, a processor of a media content consumer device and, or a server computer system may monitor for a signal that indicates that a narrative prompt or user selectable icon or other user interface element has been selected.

In response to a determination at 858 that a user input has been received, the at least one component (e.g., processor) of the system causes a presentation of at least a first image or frame of the narrative segment corresponding to the selected one of the narrative prompts. For example, a processor of a media content consumer device and, or a server computer system can cause a presentation of a first image or frame of a narrative segment to which the selected narrative prompt overlay is linked via a data structure or hyperlink.

At 860, at least one component (e.g., processor) of the system causes an animation of the at least first image or frame of the narrative segment corresponding to the selected one of the narrative prompts. For example, a processor of a media content consumer device and, or a server computer system may cause the image(s) or frame(s) of the narrative segment corresponding to the selected one of the narrative prompts to expand to cover a wider area of the display or screen, for instance sequentially expanding to cover or occupy a majority of or even an entire area of a display or screen, or for instance sequentially expanding to cover or occupy a majority of or even an entire area of a window in which the narrative presentation is being presented. For example, the at least one component can sequentially update an image buffer to cause successive images or frames of the narrative to occupy an increasing larger area. Such may include increasing a resolution, or even interpolating, as the covered area increases.

At 862, at least one component (e.g., processor) of the system determines whether an end of the narrative presentation has been reached. For example, a processor of a media content consumer device and, or a server computer system at check a time flag, time stamp or temporal coordinate of a current frame of the narrative segment currently being presented. In response to a determination that the end of the narrative presentation has not been reached, the at least one component (e.g., processor) of the system returns control to 704. In response to a determination that the end of the narrative presentation has been reached, the at least one component (e.g., processor) of the system passes control 732.

The method 800 ends at 864 until invoked again. The method 800 may be invoked, for example, each time a narrative presentation 164 is selected for presentation or view.

As previously described, the system may advantageously employ camera characteristics or parameters of a camera used to film or capture an underlying scene in order to generate or modify one or more user interface elements (e.g., narrative prompts) and, or a presentation of one or more user interface elements. For example, the system may advantageously employ camera characteristics or parameters of a camera used to film or capture an underlying scene in order to generate or modify one or more user interface elements (e.g., narrative prompts) and, or a presentation of one or more user interface elements to match a look and feel of the underlying scene. For instance, the system may match a focal length, focal range, lens ratio or f-number, focus, and, or depth-of-field. Also for instance, the system can generate or modify one or more user interface elements (e.g., narrative prompts) and, or a presentation of one or more user interface elements based on one or more camera motions, whether physical motions of the camera that occurred while filming or capturing the scene or motions (e.g., panning) added after the filming or capturing, for instance via a virtual camera applied via a virtual camera software component. Such can, for instance, be used to match a physical or virtual camera motion. Additionally or alternatively, such can, for instance, be used to match a motion of an object in a scene in the underlying narrative. For instance, a set of user interface elements can be rendered to appear to move along with an object in the scene. For instance, the set of user interface elements can be rendered to visually appear as if they were on a face of a door, and move with the face of the door as the door pivots open or closed. To achieve such, the system can render the user interface elements, for example, on their own layer or layers, which can be a separate layer from a layer on which the underlying narrative segment is rendered.

In some implementations, the system may receive one or more camera characteristics or parameters (e.g., intrinsic camera characteristics or parameters, extrinsic camera characteristics or parameters) via user input, entered for example by an operator. In such implementations, the system may, for example, present a user interface with various fields to enter or select one or more camera characteristic. Additionally or alternatively, the user interface may present a set (e.g. two or more) of camera identifiers (e.g., make/model/year, with or without various lens combinations), for instance as a scrollable list or pull-down menu, or with a set of radio buttons, for the operator to choose from. Each of the cameras or camera and lens combinations in the set can be mapped to a corresponding defined set of camera characteristics or parameters in a data structure stored one or more processor-readable media (e.g., memory). In some implementations, the system autonomously determines one or more camera characteristics or parameters by analyzing one or more frames of the narrative segment. For example, the system can be trained via various machine learning techniques to recognize various camera or camera and lens combination characteristics or parameters using a corpus of human annotated training samples of images or frames, each annotated with the respective values for one or more camera characteristics or parameters of the camera or camera and lens combination used to capture the image or frame. Alternatively, each frame or image of the training corpus may be annotated with the type of camera and, or, camera and lens combination used to capture the respective image or frame, and the types of cameras or camera and lens combination mapped to a set of camera characteristics or parameter for those camera characteristics that are fixed by the type of camera or camera and lens combination. As generally referred to herein and in the claims, when discussing camera characteristics or parameters, such is generally referring to a camera with a lens, i.e., a camera and lens combination, unless specifically identified otherwise.

The machine learning may be supervised learning, unsupervised learning, or reinforcement learning. The machine learning can, for example, employ one or more artificial neural networks. The machine learning an employ one or more auto-encoders, for example variational auto-encoders. For example an artificial neural network comprises an auto-encoder can process images to identify one or more intrinsic and, or extrinsic characteristics or parameters of one or more cameras or one or more camera and lens combinations with which the images were filmed or captured. In some embodiments, the auto-encoder is used for learning models of data to generate the intrinsic and, or extrinsic characteristics or parameters of the camera(s) or camera and lens combination(s). The variational auto-encoder may be a variational auto-encoder, which processes a sample set of images, which may for instance be annotated, with a set of assumptions regarding a distribution of a number of latent (unobserved, inferred) variables. A variational auto-encoder includes an input layer, an output layer and one or more hidden layers connecting the input and output layers. The output layer has the same number of nodes as the input layer and has the purpose of reconstructing its own inputs instead of predicting the target value given the inputs x. This reconstruction is typically represented by x̃.

A variational auto-encoder treats its inputs, hidden representations, and reconstructed outputs as probabilistic random variables within a directed graphical model. In this manner, the encoder portion becomes a variational inference network, mapping observed inputs, represented by x, to (approximate) posterior distributions over latent space, represented by z, and the decoder portion becomes a generative network, capable of mapping arbitrary latent coordinates back to distributions over the original data space. The global encoder and decoder parameters (i.e., neural network weights and biases) are represented as $\phi$ and $\theta$, respectively. The mapping of observed inputs to (approximate) posterior distributions over latent space is represented by $q_\phi(z|x)$. The sampled z is then passed to the decoder/generative network, which symmetrically builds back out to generate the conditional distribution over input space, represented as reconstruction $\tilde{x} \sim p_\theta(x|z)$. The joint distribution of input and latent variables is represented by $P_\theta(x,z) = \int P(z) P_\theta(x|z)$ and a marginal distribution of input variables is represented by $P_\theta(x) = \int P_\theta(x,z)dz$. Calculating the marginal distribution (above) is intractable, so the system for automated script generation and media production 200 uses a variational lower bound, represented by $\log P_\theta(x) \geq \log P_\theta(x) \, KL(q_\theta(z|x) \| p_\theta(z|x))$, where KL represents the Kullback-Leibler divergence and is a measure of how one probability distribution diverges from a second, expected probability distribution. The KL-divergence is with a variational posterior $q_\theta(z|x)$. The posterior distribution is a normal distribution parameterized, for example by an artificial deep neural network.

FIGS. 9A through 9E show a first animation of narrative prompts on one or more layers at various decision points in a narrative presentation, the layer(s) which overlies a narrative presentation layer on which a narrative segment continues to be presented or plays, according to at least one illustrated implementation.

Figure 9A:
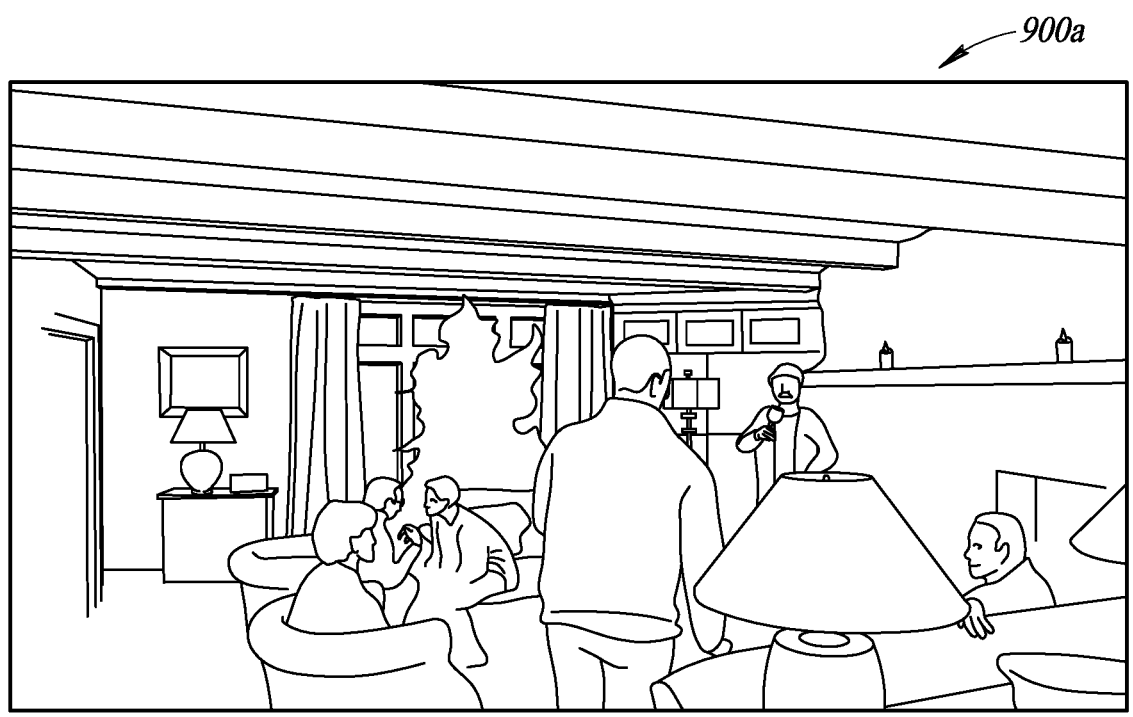
FIGS. 9A through 9E are screen shots showing animation of a set of narrative prompts on one or more layers at various decision points in a narrative presentation, and the animation of a frame from a narrative identified by a selected path direction, the layer(s) which overlies a narrative presentation layer on which narrative segments are presented, according to at least one illustrated implementation.

In particular, FIG. 9A shows a first frame 900a of a first narrative segment being presented on the narrative presentation layer at a first instance.

Figure 9B:
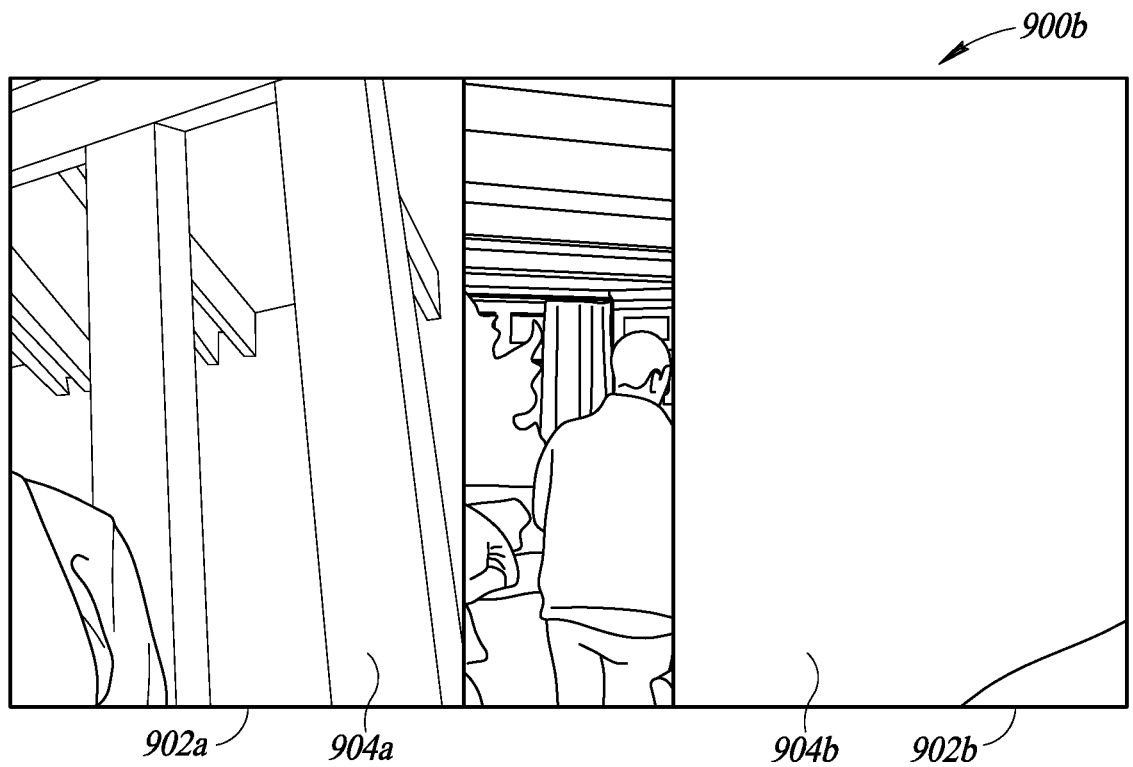

FIG. 9B shows a subsequent frame 900b of the first narrative segment being presented on the narrative presentation layer at a second instance, with a first one of the narrative prompts 902a and a second one of the narrative prompts 902b sweeping into view on narrative prompt layer that overlies the narrative presentation layer. The first narrative prompt 902a includes a frame or image 904a of a possible subsequent narrative segment along a path direction which the media content consumer can select. The second narrative prompt includes a frame or image 904b of a possible subsequent narrative segment along a path direction which the media content consumer can select. The first and the second narrative prompts 902a, 902b appears to translate laterally across the screen during the sweep or animation. For example, the first narrative prompt 902a appears to translate laterally from left to right, moving from the left edge toward a center of the screen during the sweep or animation. Also for example, the second narrative prompt 902b appears to translate laterally from right to left, moving from the right edge toward the center of the screen during the sweep or animation.

Figure 9C:

FIG. 9C shows a subsequent frame 900c of the first narrative segment being presented on the narrative presentation layer at a third instance, The second narrative prompt 902b appears to translate laterally across the screen (e.g., from left to right) during the sweep. The first narrative prompts 902a continues to appear to translate across the screen (e.g., from left to right; from left to right) during the sweep or animation.

Figure 9D:
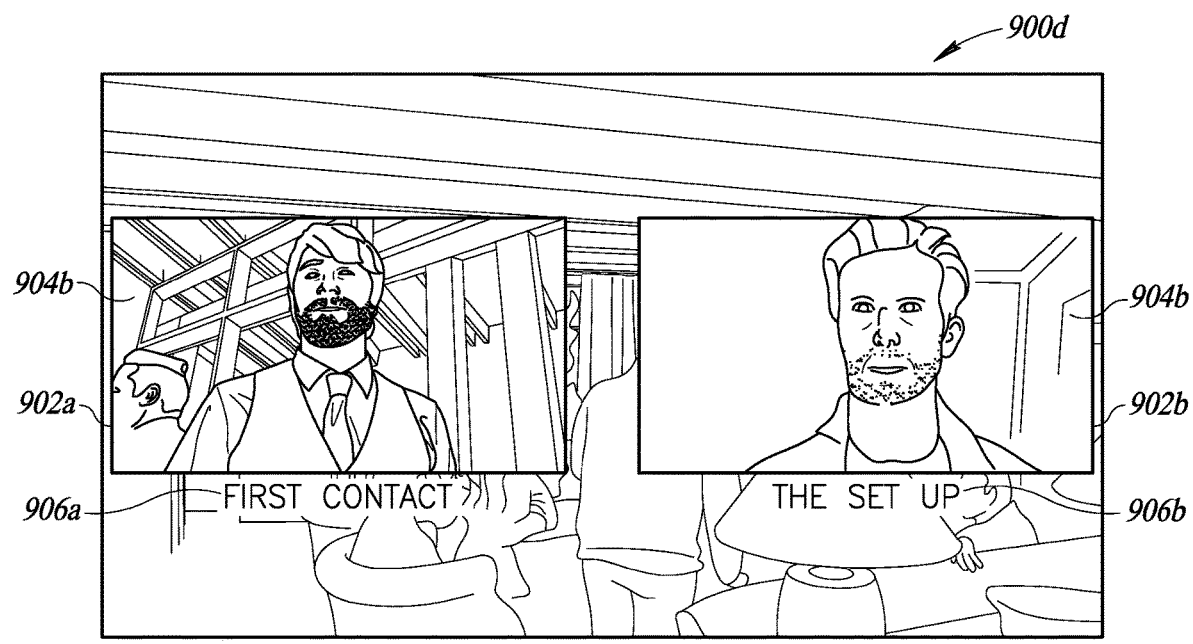

FIG. 9D shows a subsequent frame 900d of the first narrative segment being presented on the narrative presentation layer at a fourth instance, with the first and the second ones of the narrative prompts 902a, 902b in a stationary position, with respective titles 906a, 906b displayed. The narrative prompts 902a, 902b and the respective titles 906a, 906b may each delimit user selectable areas, a user selection within the user selectable area resulting in a selection, indication, or command to proceed along the corresponding narrative path direction, for instance by presenting a narrative segment associated with the selected narrative path direction.

When interacting with a device having a touch screen, selection can, for example, be via a touch with a finger or a stylus (e.g., capacitive stylus) within the respective user selectable area. When interacting with a device that does not have a touch screen, selection can, for example, be via placement of a cursor or pointer within the respective user selectable area and entry of an input while the cursor is located within the respective user selectable area. The placement of the cursor or pointer and the selection can be via a user input device (e.g., computer mouse, touchpad, trackball).

In response to selection of one of the narrative prompts, or alternatively in response to timing out of a selection period, a path direction is chosen or selected for viewing, the path direction indicative of a subsequent narrative segment (e.g., the narrative segment from which the frame associated with the narrative prompt was taken). Thus selection of the first narrative prompt 902a will cause presentation of an associated narrative segment.

Figure 9E:
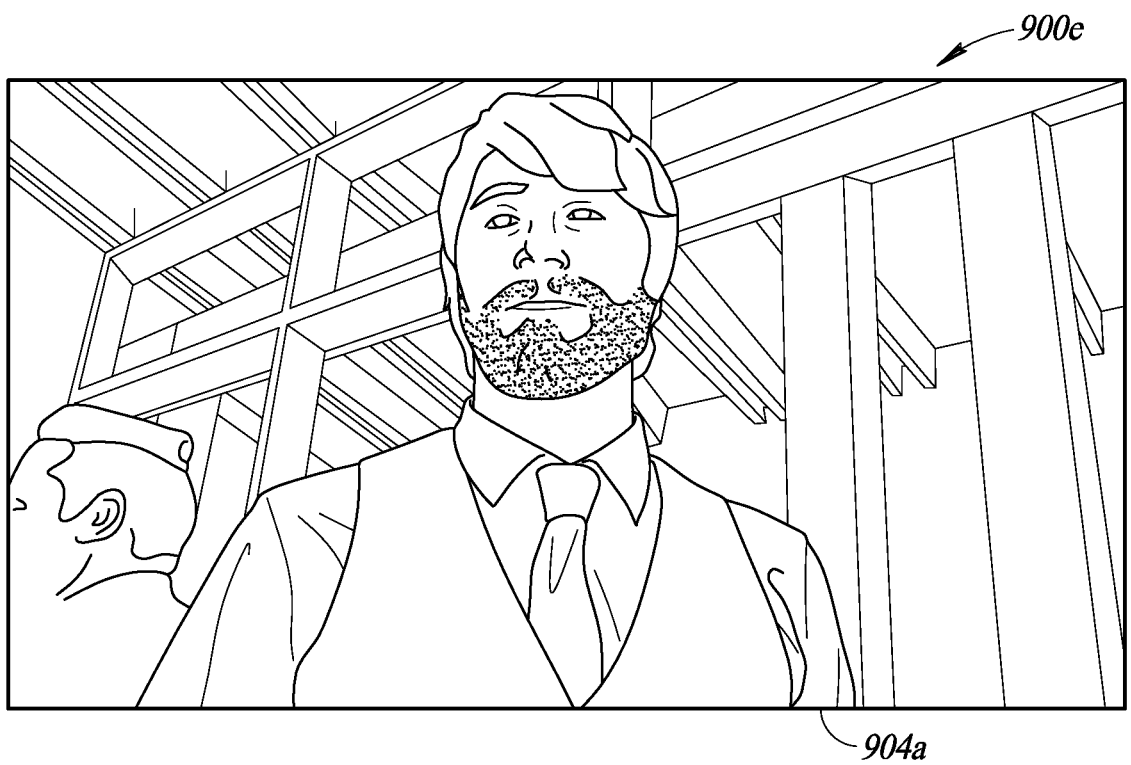

FIG. 9E shows a first frame 904a of a subsequent narrative segment corresponding to the chosen or selected path direction at a subsequent instance. The first frame 904a of the subsequent narrative segment is animated to sequentially expand from a size of the corresponding narrative prompt 902a to occupy a larger area, for example occupying all or substantially all of a window in which the narrative presentation is being presented.

FIGS. 9F through 9J show a second animation of narrative prompts on one or more layers at various decision points in a narrative presentation, the layer(s) which overlies a narrative presentation layer on which a narrative segment continues to be presented or plays, according to at least one illustrated implementation.

Figure 9F:
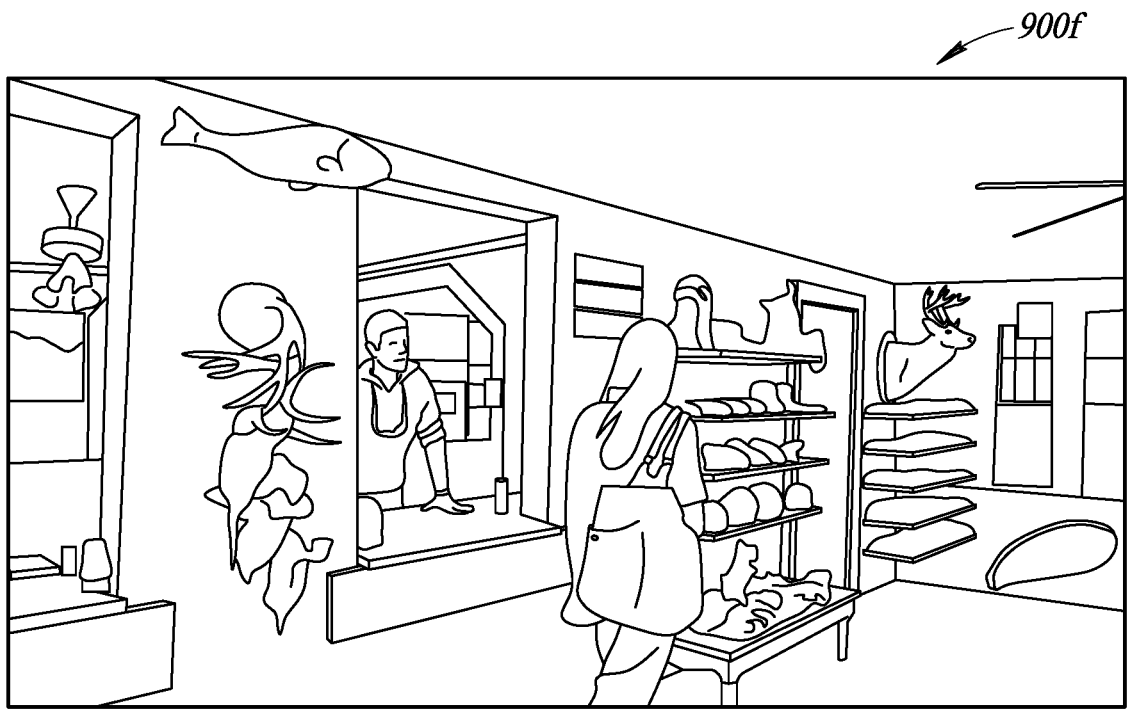
FIGS. 9F through 9I are screen shots showing animation of a set of narrative prompts on one or more layers at various decision points in a narrative presentation, and the animation of a frame from a narrative identified by a selected path direction, the layer(s) which overlies a narrative presentation layer on which narrative segments are presented, according to at least one illustrated implementation.
Figure 9G:
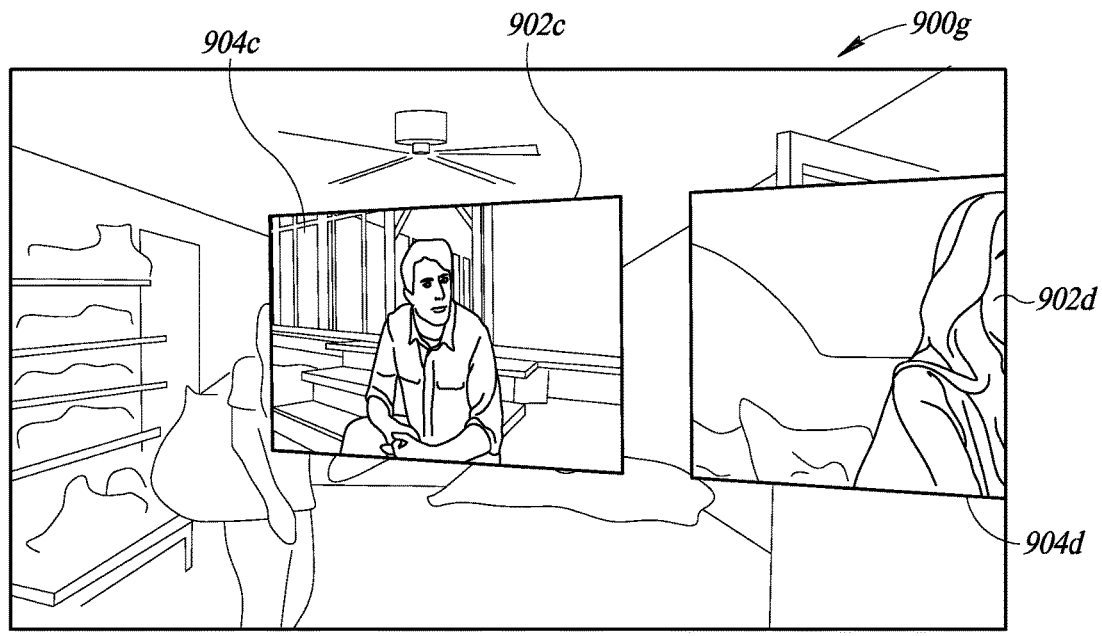

In particular, FIG. 9F shows a first frame 900f of a second narrative segment being presented on the narrative presentation layer at a first instance. FIG. 9G shows a subsequent frame 900g of the second narrative segment being presented on the narrative presentation layer at a second instance, with a first narrative prompt 902c and a second narrative prompt 902d sweeping into view on narrative prompt layer that overlies the narrative presentation layer. The first narrative prompt 902c includes a frame or image 904c of a possible subsequent narrative segment along a path direction which the media content consumer can select. The second narrative prompt 902d includes a frame or image 904d of a possible subsequent narrative segment along a path direction which the media content consumer can select. The first and second narrative prompt 902c, 902d appears to pivot outwardly from a rear of the scene toward a front, about an axis that, for example, extends vertically along a right edge of the screen during the sweep or animation.

Figure 9H:
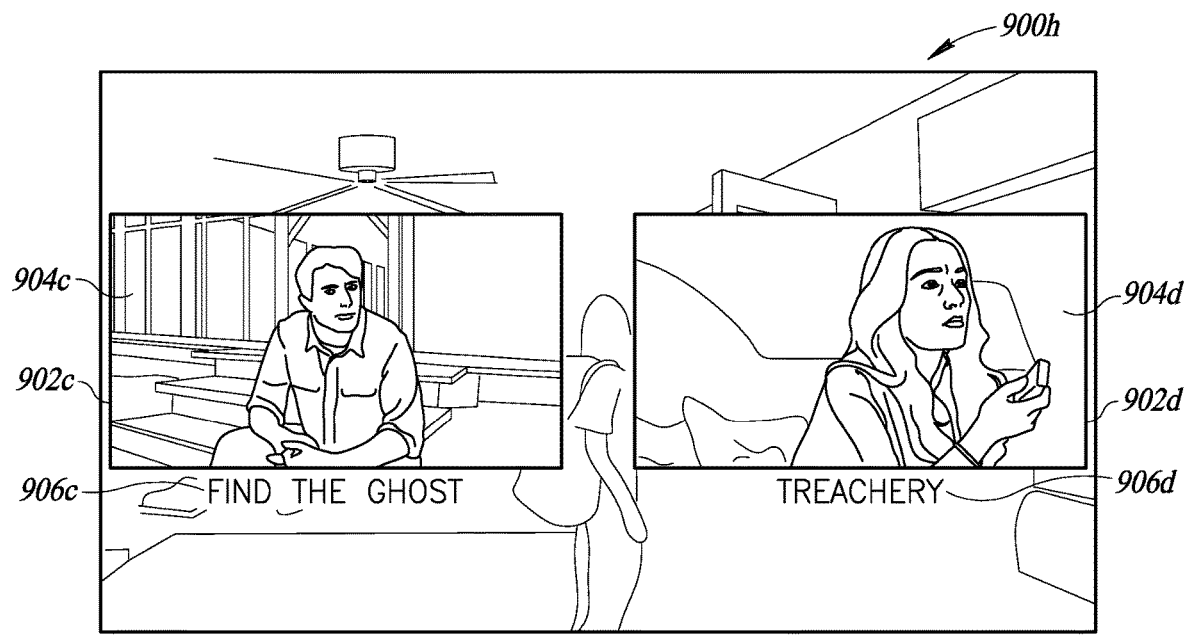

FIG. 9H shows a subsequent frame 900h of the second narrative segment being presented on the narrative presentation layer at a fourth instance, with the first and the second ones of the narrative prompts 902c, 902d in a stationary position, with respective titles 906c, 906d displayed.

Figure 9I:
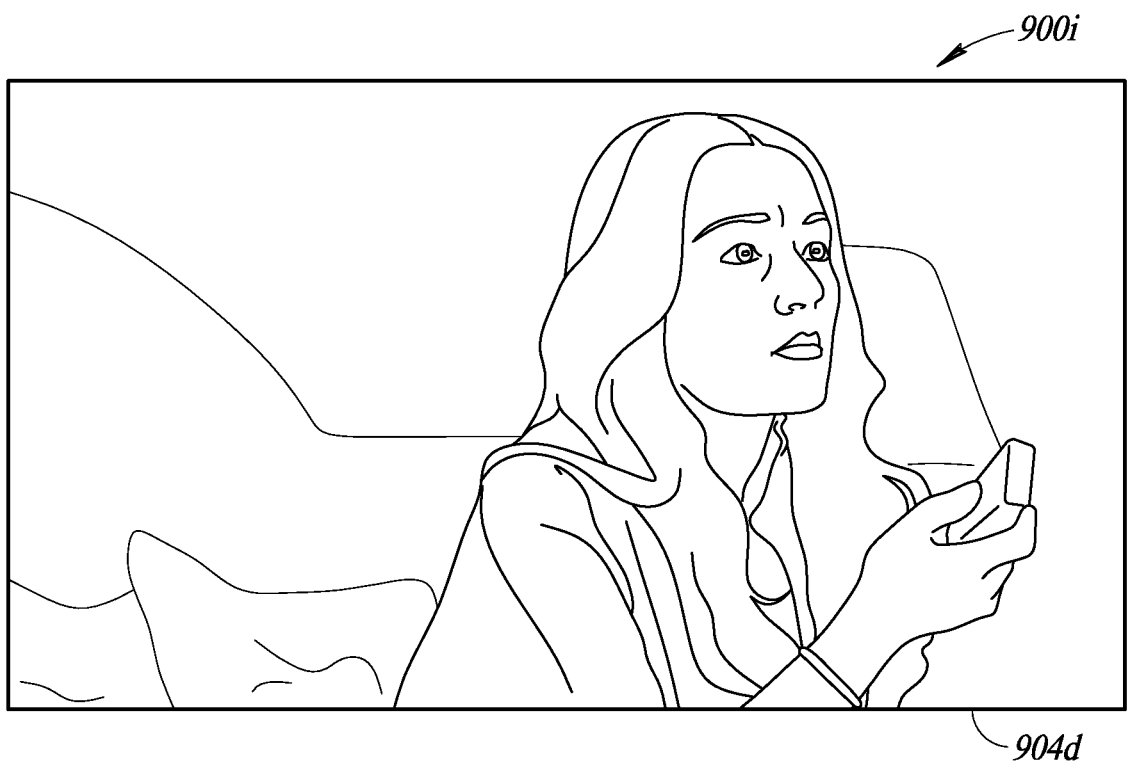

In response to selection of one of the narrative prompts, or alternatively in response to timing out of a selection period, a path direction is chosen or selected for viewing, the path direction indicative of a subsequent narrative segment. FIG. 9I shows a first frame 904d of a subsequent narrative segment corresponding to the chosen or selected path direction at a subsequent instance. The first frame 904d of the subsequent narrative segment is animated to sequentially expand from a size of the corresponding narrative prompt 902e to occupy a larger area, for example occupying all or substantially all of a window in which the narrative presentation is being presented.

FIGS. 9J through 9M show a third animation of narrative prompts on one or more layers at various decision points in a narrative presentation, the layer(s) which overlies a narrative presentation layer on which a narrative segment continues to be presented or plays, according to at least one illustrated implementation.

Figure 9J:
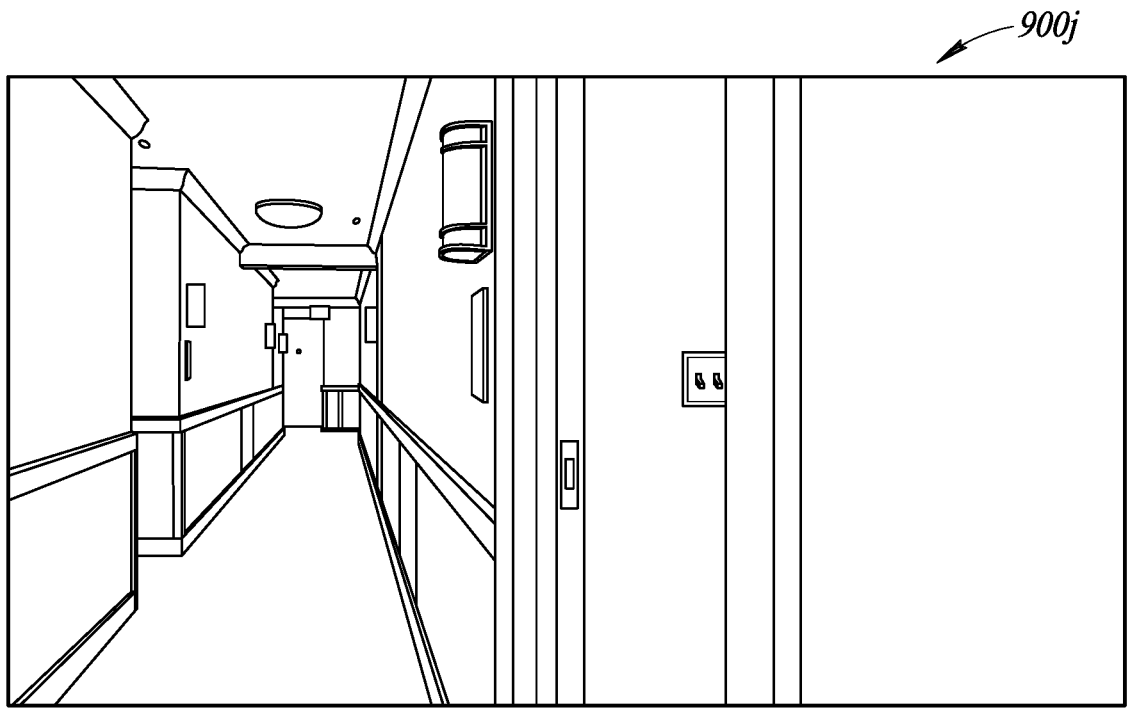
FIGS. 9J through 9M are screen shots showing animation of a set of narrative prompts on one or more layers at various decision points in a narrative presentation, and the animation of a frame from a narrative identified by a selected path direction, the layer(s) which overlies a narrative presentation layer on which narrative segments are presented, according to at least one illustrated implementation.
Figure 9K:
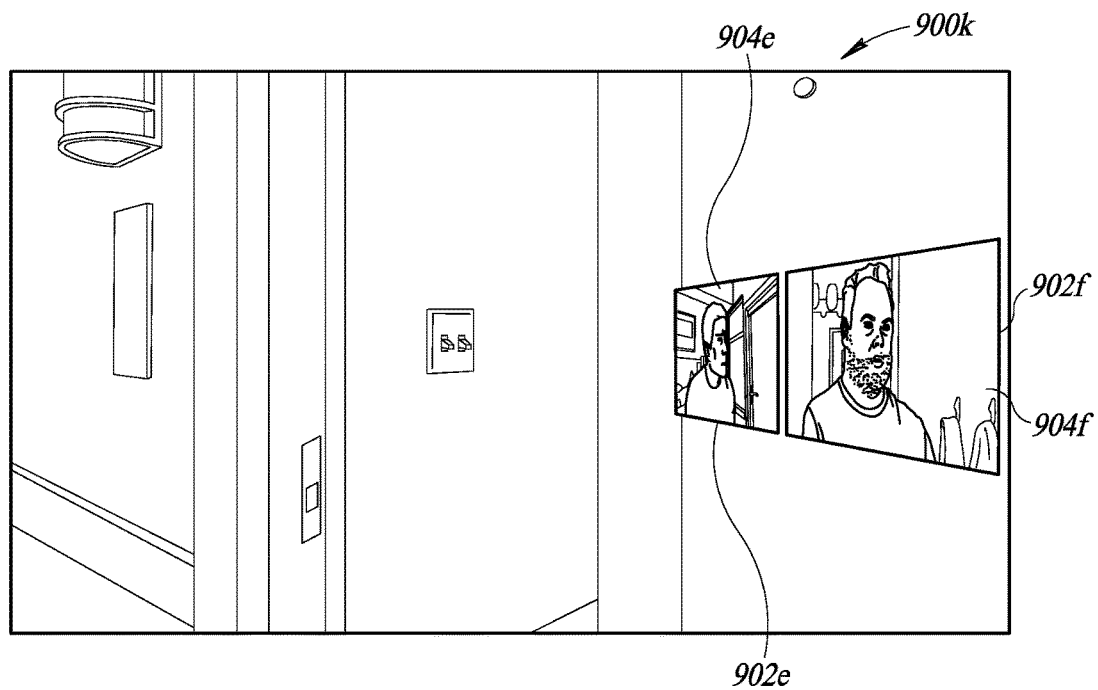

In particular, FIG. 9J shows a first frame 900j of a third narrative segment being presented on the narrative presentation layer at a first instance. FIG. 9K shows a subsequent frame 900k of the third narrative segment being presented on the narrative presentation layer at a second instance, with a first narrative prompt 902e and a second narrative prompt 902f sweeping into view on narrative prompt layer that overlies the narrative presentation layer. The first narrative prompt 902e includes a frame or image 904e of a possible subsequent narrative segment along a path direction which the media content consumer can select. The second narrative prompt 902f includes a frame or image 904f of a possible subsequent narrative segment along a path direction which the media content consumer can select. The first and second narrative prompts 902e, 902f appears to pivot together inwardly into the scene along with a door in the scene, about an axis that, for example, extends vertically along a right edge of the screen during the sweep or animation.

Figure 9L:
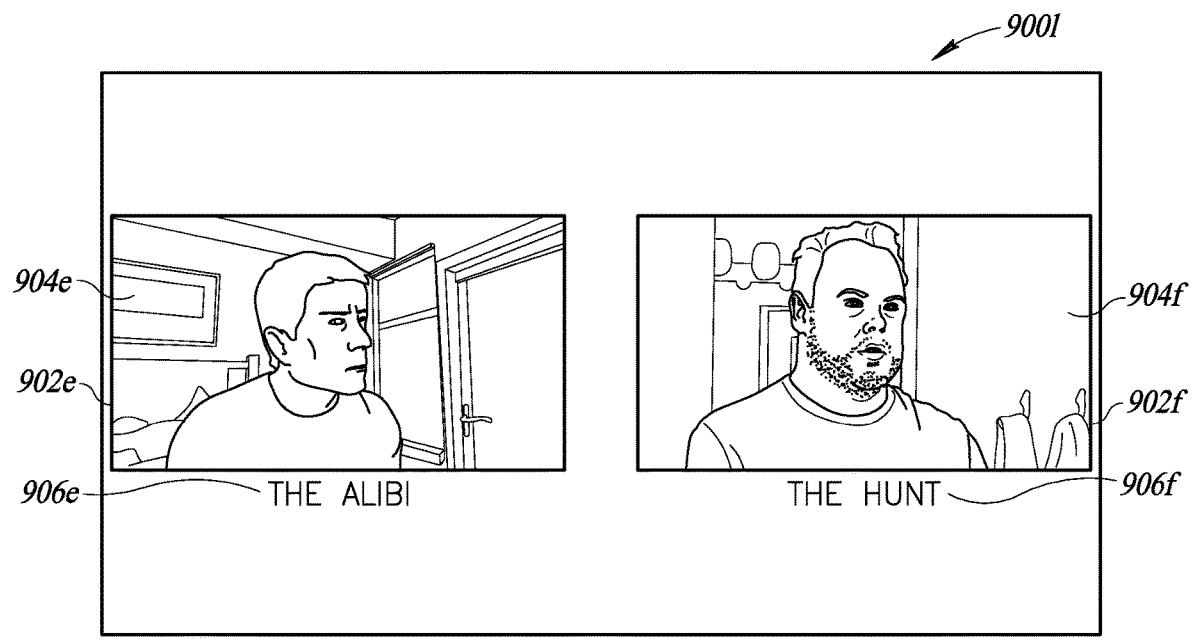

FIG. 9L shows a subsequent frame 900h of the third narrative segment being presented on the narrative presentation layer at a fourth instance, with the first and the second ones of the narrative prompts 902e, 902f in a stationary position, with respective titles 906e, 906f displayed.

Figure 9M:

In response to selection of one of the narrative prompts, or alternatively in response to timing out of a selection period, a path direction is chosen or selected for viewing, the path direction indicative of a subsequent narrative segment. FIG. 9M shows a first frame 904f of a subsequent narrative segment corresponding to the chosen or selected path direction at a subsequent instance. The first frame 904f of the subsequent narrative segment is animated to sequentially expand from a size of the corresponding narrative prompt 902d to occupy a larger area, for example occupying all or substantially all of a window in which the narrative presentation is being presented.

Figure 9N:
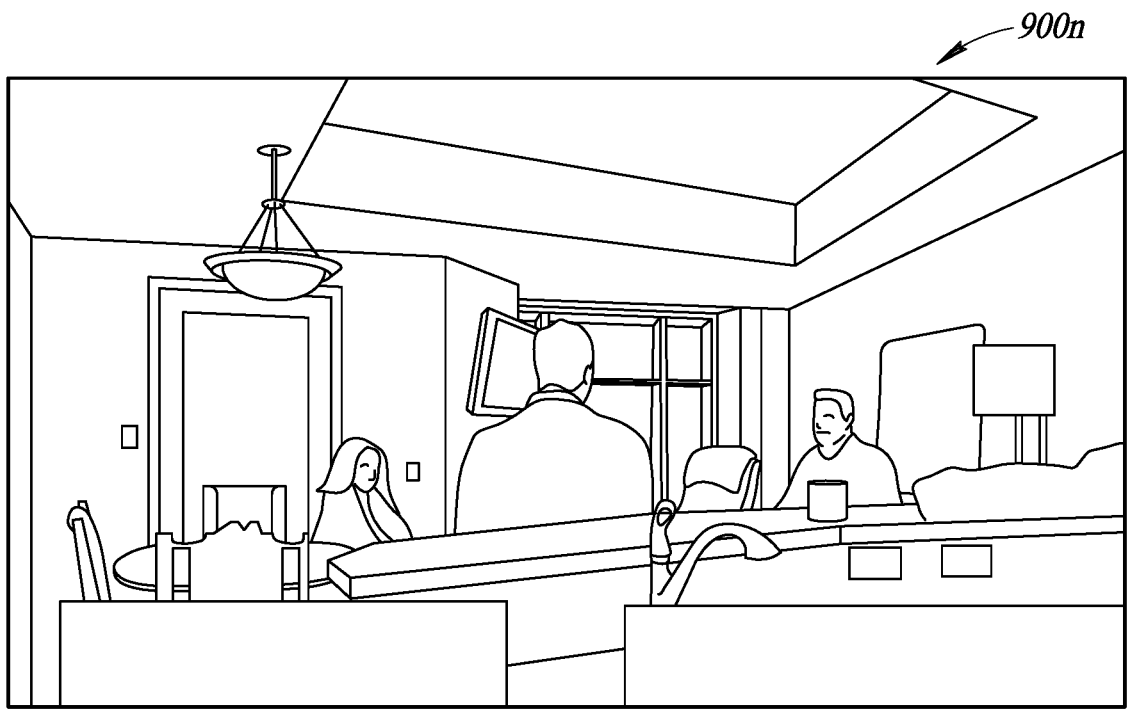
FIGS. 9N through 9P are screen shots showing animation of a set of narrative prompts on one or more layers at various decision points in a narrative presentation, the layer(s) which overlies a narrative presentation layer on which narrative segments are presented, according to at least one illustrated implementation.
Figure 9O:
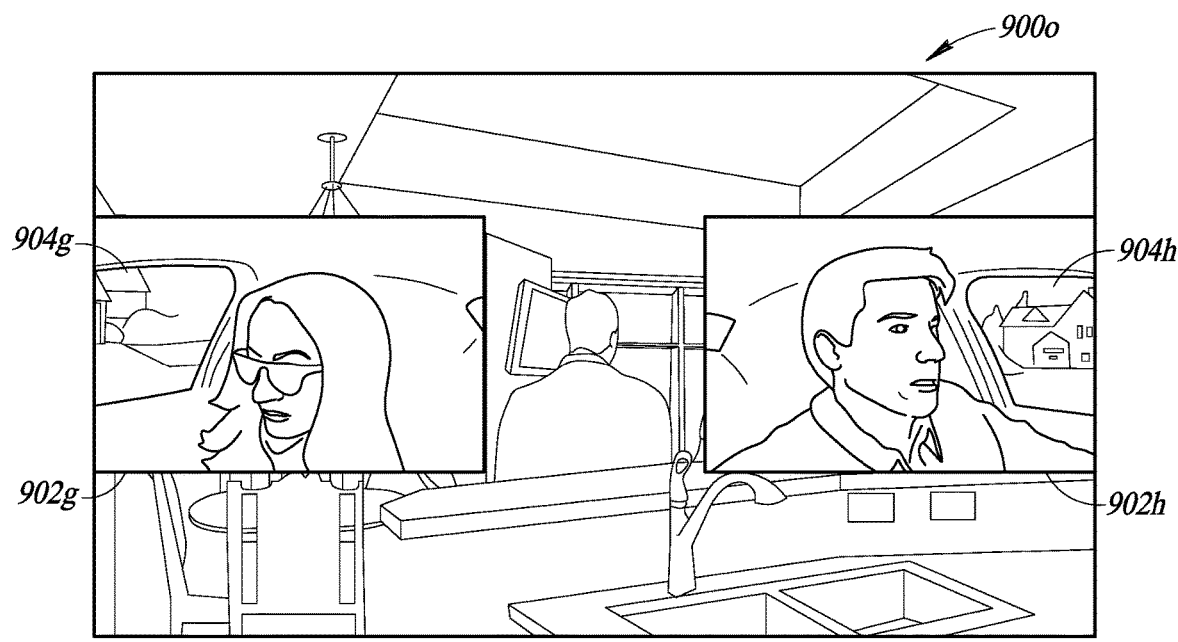
Figure 9P:
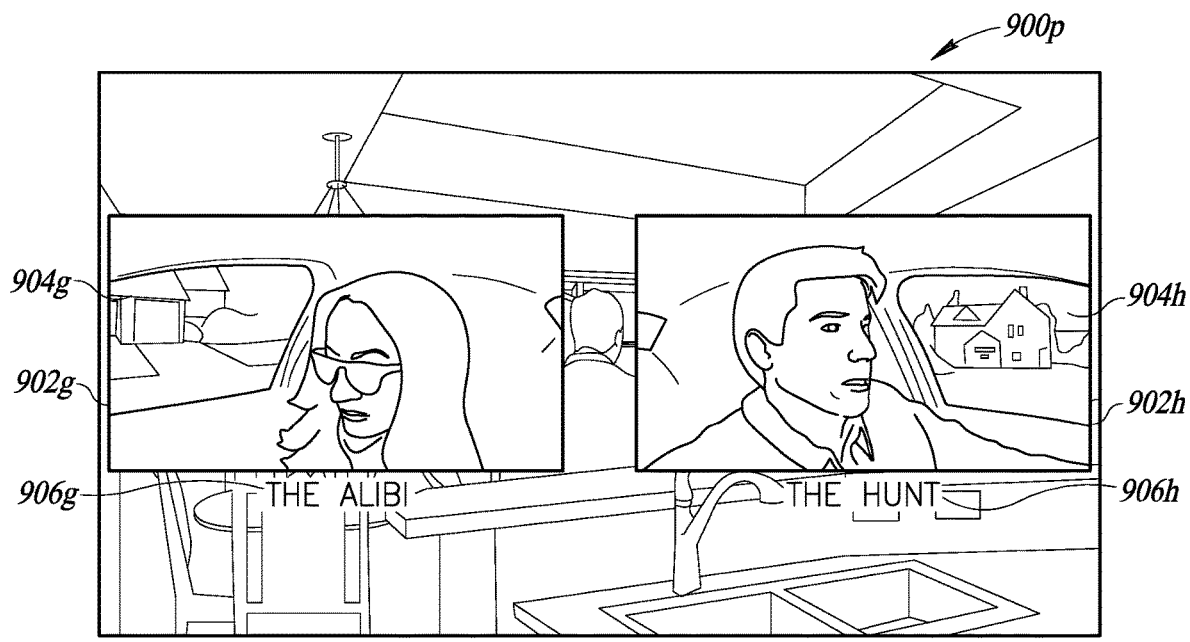

FIGS. 9N through 9P show a fourth animation of narrative prompts on one or more layers at various decision points in a narrative presentation, the layer(s) which overlies a narrative presentation layer on which a narrative segment continues to be presented or plays, according to at least one illustrated implementation.

In particular, FIG. 9N shows a first frame 900n of a fourth narrative segment being presented on the narrative presentation layer at a first instance, with a first narrative prompt 902g and a second narrative prompt 902h sweeping into view on narrative prompt layer that overlies the narrative presentation layer. The first narrative prompt 902g includes a frame or image 904g of a possible subsequent narrative segment along a path direction which the media content consumer can select. The second narrative prompt 902h includes a frame or image 904g of a possible subsequent narrative segment along a path direction which the media content consumer can select.

FIG. 9O shows a first frame 900o of a fourth narrative segment being presented on the narrative presentation layer at a first instance, with a first narrative prompt 902g and a second narrative prompt 902h. The first and second narrative prompts 902g, 902h appear to translate with respect to the scene, for example moving vertically from a bottom to a top of the screen during the sweep or animation.

FIG. 9P shows a subsequent frame 900p of the fourth narrative segment being presented on the narrative presentation layer at a fourth instance, with the first and the second ones of the narrative prompts 902g, 902h in a stationary position, with respective titles 906g, 906h displayed.

In the implementations described in FIGS. 9A-9O, the narrative prompts are presented or generated to mimic a look and feel of the underlying narrative segment, for example based on intrinsic and extrinsic parameters of a camera used to record or capture the underlying narrative segment. The animations may also advantageously be presented or generated to mimic the look and feel of the underlying narrative segment, for example sweeping or panning with the view of the camera used to record or capture the underlying narrative segment.

Figure 10:
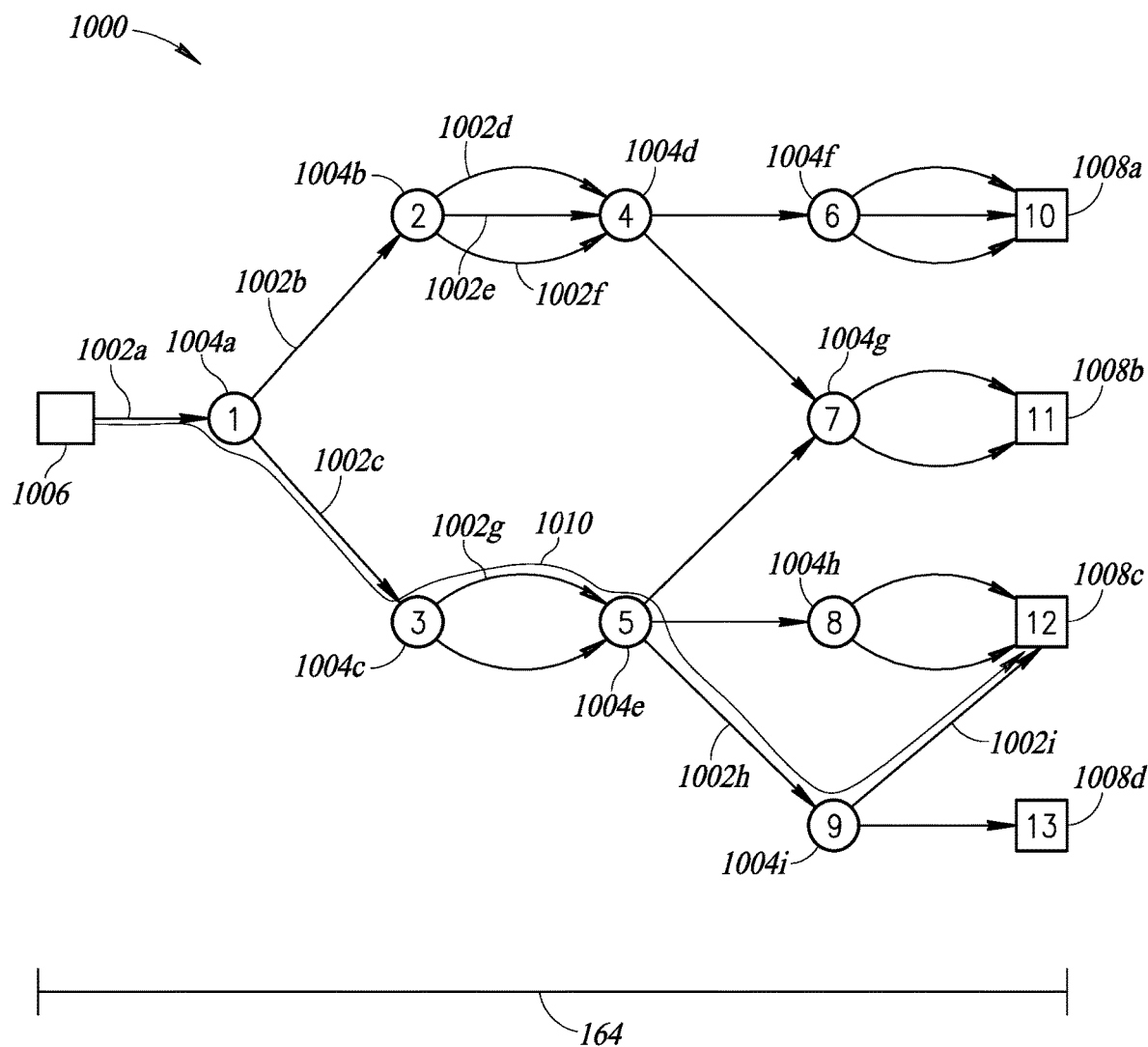
FIG. 10 is a schematic diagram of a directed acyclic graph data structure that may be used to store a narrative presentation that includes a number of points (e.g., decision points) and narrative segments, according to at least one illustrated implementation.

FIG. 10 shows a directed acyclic graph (DAG) data structure 1000 used to store narrative segments 202 and associated points 1004 (e.g., decision points) of a narrative presentation 164, according to at least one illustrated implementation. The DAG data structure 1000 may include a number of points 1004 (e.g., decision points) each of which corresponds to a decision point (e.g., segment decision points) within a narrative presentation. In some implementations, respective narrative prompts 204 may be presented at one or more of the points 206. The points 1004 may represent a location within the narrative presentation at which one narrative segment 202 out of a set of multiple narrative segments 202 may be presented to the media content consumer 130. The narrative segments 202 may be represented as one or more edges 1002 that connect between two different points 1004 (e.g., decision points).

A first edge 1002a may represent the foundational or beginning narrative segment that starts at a beginning 1006 of the narrative presentation 164. The foundational or beginning narrative segment may provide a common setting for the ultimate storyline or plotline created by subsequent user-selected narrative segments 202. The first edge 1002a may extend from the beginning 1006 to the first point 1004a (e.g., decision point) at which the narrative presentation 164 may proceed along one of two narrative paths. The first narrative path corresponds to a second edge 1002b that extends between the first point 1004a (e.g., decision point) and a second point 1004b (e.g., decision point), whereas the second narrative path corresponds to a third edge 1002c that extends between the first point 1004a (e.g., decision point) and a third point 1004c (e.g., decision point). In such an implementation, a media content consumer 130 may be provided with a narrative prompt 204 to choose between the first narrative path or the second narrative path.

As shown in FIG. 10, the second point 1004b (e.g., decision point) may provide the option of presenting one narrative segment out of a set of three narrative segments, corresponding to fourth edge 1002d, fifth edge 1002e, and sixth edge 1002f. Each of the fourth edge 1002d, fifth edge 1002e, and sixth edge 1002f may extend between the second point 1004b (e.g., decision point) and a fourth point 1004d (e.g., decision point). In such an implementation, the respective narrative segments 202 associated with each of the fourth edge 1002d, fifth edge 1002e, and sixth edge 1002f may be used to customize the narrative segment 202 presented to the media content consumer 130. As discussed above, such customization may be based upon selection parameters and values associated with the respective narrative segments 202 for each of the fourth edge 1002d, fifth edge 1002e, and sixth edge 1002f. These selection parameters and values for each narrative segment 202 may be compared against the collected information related to the media content consumer 130 to determine the narrative segment to be presented.

The media content consumer 130 may proceed from the beginning 1006 of the narrative presentation 164 through various points 1004 (e.g., decision point) and edges 1002 until reaching one of the ending points 1008a-1008d (collectively, "ending points 1008") at which point the narrative presentation 164 ends. The media content consumer 130 may take one of any number of narrative paths, such as narrative path 1010, from the beginning 1006 to one of the ending points 1008. The narrative path 1010, as an example, proceeds from the beginning 1006 to the first point 1004a (e.g., decision point), and along the third edge 1002c to the third point 1004c (e.g., decision point). At the third point 1004c (e.g., decision point), the narrative path 1010 proceeds along edge 1002g to a fifth point 1004e (e.g., decision point). At the fifth point 1004e (e.g., decision point), the narrative path 1010 proceeds along edge 1002h to a ninth point 1004i (e.g., decision point), where the narrative path 1010 continues along edge 1002i to the ending point 1008c. Thus, the graph of the DAG data structure 1000 may form an acyclic graph in which the media content consumer 130 proceeds from the beginning 1006 to one of the ending point 1008 without the possibility of forming a continuous loop. In addition, data structure 1000 may form a directed acyclic graph because the edges 1002, which correspond to narrative segments, proceed in one direction between connected points 1004 (e.g., decision points).

Figure 11:
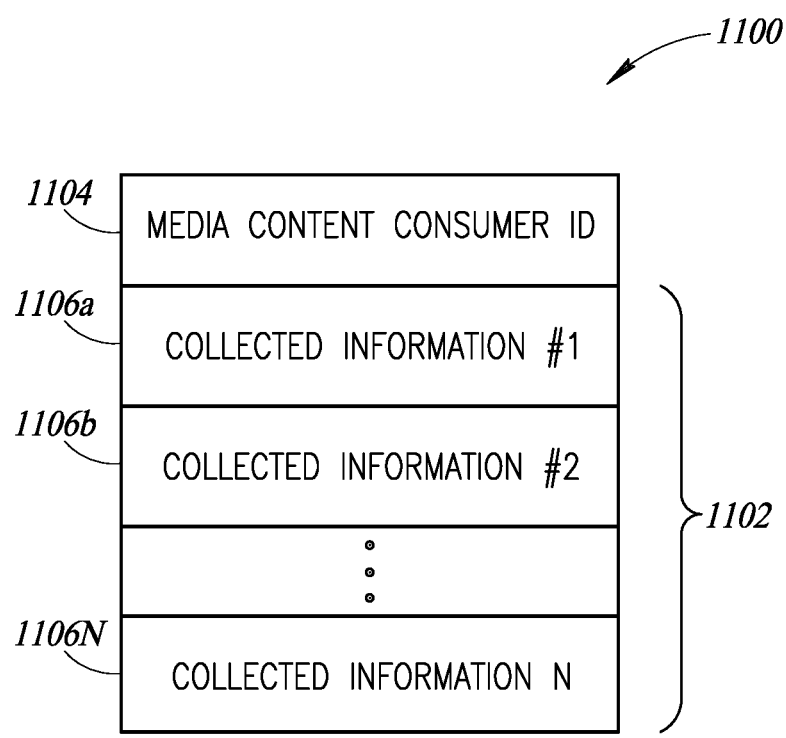
FIG. 11 is a schematic diagram of a data structure in the form of a record and field used to store collected information regarding a media content consumer, according to at least one illustrated implementation.

FIG. 11 shows a data structure 1100 in the form of a record and fields used to store collected information 1102 regarding a media content consumer 130, according to at least one illustrated implementation. In some implementations, the data structure 1100 may be in the form of an entry in a database program that is being executed by a processor-enabled device (e.g., the Web server 160), although the collected information 1102 may be stored in other types of data structures. The data structure 1100 may include a field that contains a media content consumer identification 1104, such as the name or number associated with the media content consumer 130. One or more other fields 1106 (e.g., first field 1106a, second field 1106b, N field 1106N, collectively) may be used to store the collected information 1102 associated with the media content consumer. The fields 1106 may include, for example, demographic information related to the media content consumer 130, information related to the narrative presentations 200 selected and previously presented to the media content consumer 130, prior selections by the media content consumer 130 at previous narrative prompts 204, Webpage viewing history for the media content consumer 130, purchase history for the media content consumer 130, as well as other similar information.

While data structures in the form of a DAG data structure 1000 (FIG. 9) and records and fields (FIG. 11) are illustrated, the system can alternatively or additionally employ other data structures. For example, valid narrative paths from one narrative segment to sets of other narrative segments can be represented as other graphs, linked lists, arrays, table. Also for example, collected information can be represented as an array, record, tuple, union, tagged union, linked list, set, or table.

In some implementations, at least one component (e.g., processor) of the system may cause a presentation to a media content consumer of a graph of: i) a narrative path available to be taken by the media content consumer at that point in time; ii) a narrative path actually taken by the media content consumer to that point in time; iii) both a narrative path available to be taken and a narrative path actually taken by the media content consumer at a given point in time, for instance using different visual effects (e.g., color, highlighting, line weight, line type) to distinguish between the available narrative path and the already taken narrative path.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. No. 6,554,040; U.S. provisional patent application Ser. No. 61/782,261; U.S. provisional patent application Ser. No. 62/031,605; and U.S. nonprovisional patent application Ser. No. 14/209,582, with the present disclosure are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a processor-based system that is operable to present a number narratives, each of the narratives comprising a respective plurality of narrative segments, each of the of narrative segments comprising a respective plurality of successive images, the method comprising:

for a current one of the narrative segments of a current one of the narratives, causing a presenting of a respective plurality of successive images of the current one of the narrative segments;

at a temporal point in the presentation of the current one of the narrative segments before a last one of the respective plurality of successive images of the current one of the narrative segments has been presented, causing a presenting of at least two user selectable user interface elements while continuing the presenting of the respective plurality of successive images of the current one of the narrative segments, the at least two user selectable user interface elements corresponding to respective other ones of narrative segments of the current narrative other than the current one of the narrative segments of the current narrative and the at least two user selectable user interface elements each including at least one image of the corresponding other ones of the narrative segments, the at least two user selectable user interface elements presented overlaid with the current one of the narrative segments of the current narrative;

determining screen coordinates for location of the user selectable user interface elements;

determining the temporal point within the presentation of the current one of the narrative segments in which to at least start presenting the user selectable user interface elements;

creating overlay views of the user selectable user interface elements with respective links to other ones of the narrative segments;

initially causing overlay views of the user selectable user interface elements to be hidden from presentation during the presentation of the current one of the narrative segments;

determining whether the temporal point within the presentation of the current one of the narrative segments has been reached; and in response to reaching the temporal point within the presentation of the current one of the narrative segments, causing overlay views of the user selectable user interface elements to be rendered as visible during the presentation of the current one of the narrative segments at the respective screen coordinates.

2. The method of claim 1 wherein causing a presenting of at least two user selectable user interface elements while continuing the presenting of the respective plurality of successive images of the current one of the narrative segments includes causing a presenting of the at least two user selectable user interface elements each including a respective first image of the corresponding other ones of the narrative segments.

3. The method of claim 1 wherein causing a presenting of at least two user selectable user interface elements while continuing the presenting of the respective plurality of successive images of the current one of the narrative segments includes causing a presenting at least two user selectable icons on a display screen, each of the user selectable icons including a respective first image of the corresponding other ones of the narrative segments, the user selectable icons which are stored as part of an image file that represents the plurality of images of the current sequence before presenting a first one of the respective plurality of images of the current one of the narrative segments.

4. The method of claim 1, further comprising:
determining at least one of at least one intrinsic characteristic or at least one extrinsic characteristic of at least one camera with which the respective plurality of images of the current one of the narrative segments was captured; and
generating each of the user selectable icons that include the respective first image of the corresponding other ones of the narrative segments based on the determined at least one of at least one intrinsic characteristic or at least one extrinsic characteristic of the at least one camera with which the respective plurality of images of the current one of the narrative segments was captured.

5. The method of claim 4 wherein generating each of the user selectable icons that include the respective first image of the corresponding other ones of the narrative segments based on the determined at least one of at least one intrinsic characteristic or at least one extrinsic characteristic of the at least one camera with which the respective plurality of images of the current one of the narrative segments was captured includes generating each of the user selectable icons that include the respective first image of the corresponding other ones of the narrative segments to mimic the determined intrinsic and extrinsic characteristics of the at least one camera.

6. The method of claim 5 wherein generating each of the user selectable icons that include the respective first image of the corresponding other ones of the narrative segments to mimic the determined intrinsic and extrinsic characteristics of the at least one camera occurs in a production phase prior to presentation of the current narrative.

7. The method of claim 5 wherein generating each of the user selectable icons that include the respective first image of the corresponding other ones of the narrative segments to mimic the determined intrinsic and extrinsic characteristics of the at least one camera occurs in a post-production phase, after presenting a first one of the respective plurality of images of the current one of the narrative segments.

8. The method of claim 1, further comprising:
retrieving at least a respective first image of the respective sequence of images of each of the other ones of the narrative segments of the narrative before presenting a final one of the respective plurality of images of the current one of the narrative segments.

9. The method of claim 8, further comprising:
animating each of the user selectable icons that include the respective first image of the corresponding other ones of the narrative segments based on at least one of at least one intrinsic characteristic or at least one extrinsic characteristic of the at least one camera with which the respective plurality of images of the current one of the narrative segments was captured.

10. The method of claim 9 wherein animating each of the user selectable icons includes animating each of the user selectable icons via at least one virtual three-dimensional camera as an overlay to the plurality of images of the current narrative segment in real time as the plurality of images of the current narrative segment are presented.

11. The method of claim 9 wherein animating each of the user selectable icons includes at least one of: rotating each of the user selectable icons into a respective frame of each of a number of images of the plurality of images of the presentation of the current narrative segment via at least one virtual three-dimensional camera; panning each of the user selectable icons into a respective frame of each of a number of images of the plurality of images of the presentation of the current narrative segment via at least one virtual three-dimensional camera; or sweeping each of the user selectable icons into a respective frame of each of a number of images of the plurality of images of the presentation of the current narrative segment via at least one virtual three-dimensional camera.

12. The method of claim 1, further comprising:
in response to selection of one of the at least two user selectable user interface elements before presenting a final one of the respective plurality of images of the current one of the narrative segments, stopping the presenting of the respective plurality of images of the current one of the narrative segments, and causing a presenting of a respective plurality of successive images of the other one of the narrative segments that corresponds to the selected one of the at least two user selectable user interface elements.

13. The method of claim 1, further comprising:
in response to expiration of a selection period after presenting a final one of the respective plurality of images of the current one of the narrative segments, causing a presenting of a respective plurality of successive images of a default one of the narrative segments.

14. The method of claim 1, further comprising:
determining if one of the user selectable user interface elements has been selected; and
in response to the selection one of the user selectable user interface elements, causing an animation of a first image of the corresponding other one of the narrative segment to cover increase in area, replacing or occluding a final image of the current narrative segment.

15. The method of claim 14 wherein causing an animation of a first image of the corresponding other one of the narrative segment to cover increase in area, replacing or occluding a final image of the current narrative segment includes causing the animation of the first image of the corresponding other one of the narrative segment via a virtual three-dimensional camera.

16. The method of claim 14, further comprising:
causing a presenting of a respective plurality of successive images of the corresponding other one of the narrative segment as a new current one of the narrative segments.

17. The method of claim 16, further comprising:
receiving a set of properties and operations for a number of supported three-dimensional properties supported by the processor-based system;

parsing respective values of the set of properties; and
assigning the parsed values to at least one virtual three-dimensional camera and at least one three-dimensional animation before creating the overlay views of the user selectable user interface elements.

18. The method of claim 16, further comprising:
receiving a specification of a three-dimensional camera environment by the processor-based system, the three-dimensional camera environment which represents a physical three-dimensional camera with which the images were captured; and
mapping at least one virtual three-dimensional camera to the three-dimensional camera environment.

19. The method of claim 16, further comprising:
determining whether any three-dimensional objects have been identified as occluding objects; and
for any three-dimensional objects have been identified as occluding objects, occluding any virtual elements that would otherwise overlay with the any three-dimensional objects that have been identified as occluding objects when causing the animation of the first image of the corresponding other one of the narrative segments.

20. A processor-based system that is operable to present a number narratives, each of the narratives comprising a respective plurality of narrative segments, each of the of narrative segments comprising a respective plurality of successive images, the system comprising:
at least one processor;
at least one nontransitory processor-readable medium that stores at least one of processor-executable instructions or data which, when executed by at least one processor, cause the at least one processor to:
for a current one of the narrative segments of a current one of the narratives, cause a presentation of a respective plurality of successive images of the current one of the narrative segments;
at a temporal point in the presentation of the current one of the narrative segments before a last one of the respective plurality of successive images of the current one of the narrative segments has been presented, cause a presentation of at least two user selectable user interface elements while continuing the presentation of the respective plurality of successive images of the current one of the narrative segments, the at least two user selectable user interface elements corresponding to respective other ones of narrative segments of the current narrative other than the current one of the narrative segments of the current narrative and the at least two user selectable user interface elements each including at least one image of the corresponding other ones of the narrative segments, the at least two user selectable user interface elements presented overlaid with the current one of the narrative segments of the current narrative;
determine screen coordinates for location of the user selectable user interface elements;
determine the temporal point within the presentation of the current one of the narrative segments in which to at least start presenting the user selectable user interface elements;
create overlay views of the user selectable user interface elements with respective links to other ones of the narrative segments;
initially cause overlay views of the user selectable user interface elements to be hidden from presentation during the presentation of the current one of the narrative segments;
determine whether the temporal point within the presentation of the current one of the narrative segments has been reached; and
in response to reaching the temporal point within the presentation of the current one of the narrative segments, cause overlay views of the user selectable user interface elements to be rendered as visible during the presentation of the current one of the narrative segments at the respective screen coordinates.

21. The processor-based system of claim 20 wherein, when executed by at least one processor, the at least one of processor-executable instructions or data cause the at least one processor further to:
determine at least one of at least one intrinsic characteristic or at least one extrinsic characteristic of at least one camera with which the respective plurality of images of the current one of the narrative segments was captured; and
generate each of the user selectable icons that include the respective first image of the corresponding other ones of the narrative segments based on the determined at least one of at least one intrinsic characteristic or at least one extrinsic characteristic of the at least one camera with which the respective plurality of images of the current one of the narrative segments was captured.

* * * * *